United States Patent
Garsha et al.

(10) Patent No.: US 10,614,284 B2
(45) Date of Patent: Apr. 7, 2020

(54) DESCRIPTIVE MEASUREMENTS AND QUANTIFICATION OF STAINING ARTIFACTS FOR IN SITU HYBRIDIZATION

(71) Applicant: Ventana Medical Systems, Inc., Tucson, AZ (US)

(72) Inventors: Karl Garsha, Sahuarita, AZ (US); Michael Otter, Tucson, AZ (US); Jefferson Taft, Sahuarita, AZ (US); Benjamin Stevens, Oro Valley, AZ (US); Frank Ventura, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 109 days.

(21) Appl. No.: 15/819,676

(22) Filed: Nov. 21, 2017

(65) Prior Publication Data

US 2018/0121709 A1    May 3, 2018

Related U.S. Application Data

(63) Continuation of application No. PCT/EP2016/061859, filed on May 25, 2016.
(Continued)

(51) Int. Cl.
*G06K 9/00* (2006.01)
*G06K 9/38* (2006.01)
(Continued)

(52) U.S. Cl.
CPC ........... *G06K 9/00127* (2013.01); *G01N 1/30* (2013.01); *G06K 9/38* (2013.01); *G06K 2009/4657* (2013.01)

(58) Field of Classification Search
None
See application file for complete search history.

(56) References Cited

U.S. PATENT DOCUMENTS

2008/0266652 A1    10/2008    Yazdanfar et al.
2008/0273788 A1    11/2008    Soenksen et al.
(Continued)

FOREIGN PATENT DOCUMENTS

WO    2009020972 A2    2/2009

OTHER PUBLICATIONS

Mistry, Darshana, Asim Banerjee, and Aditya Tatu. "Image similarity based on joint entropy (joint histogram)." Proc. International Conference on advances in Engineering and Technology. 2013. (Year: 2013).*
(Continued)

*Primary Examiner* — Michelle M Entezari
(74) *Attorney, Agent, or Firm* — Charney IP Law LLC; Thomas M. Finetti

(57) ABSTRACT

Immunohistochemistry (IHC) and in situ hybridization (ISH) have the aim of detecting, localizing and quantifying certain analytes for various diagnostic purposes. The quality of the stains which are analyzed may deviate for various reasons. Therefore, the present invention provides a method and system for assessing the stain quality and for establishing objective criteria for assessing the stain quality for application in the fields of in-situ hybridization and immunohistochemistry. In one possible embodiment, the invention comprises the steps of unmixing multi-spectral image data of a tissue specimen to obtain analyte intensity images, each analyte intensity image comprising signals from a single stain, computing metrics based on the analyte intensity images, wherein the metrics are uniformity, distribution and/or dispersion of pixel intensity values in the analyte intensity images and assessing a stain quality of a slide by comparing the computed metrics to pre-determined cutoff values regarding uniformity, distribution and/or dispersion of pixel intensity, wherein the stain quality of the slide is
(Continued)

assessed as acceptable if the computed metrics meet or exceed the pre-determined cutoff values, and wherein the stain quality of the slide is assessed as unacceptable if the computed metrics do not meet the pre-determined cutoff values. In order to establish objective criteria for assessing stain quality, in one possible embodiment, the method and system includes the step of deriving cut-off values for uniformity, distribution and/or dispersion of pixel intensity by combining the computed metrics based on the analyte intensity images with pre-established data quantifying the stain quality.

16 Claims, 16 Drawing Sheets

Related U.S. Application Data

(60) Provisional application No. 62/328,041, filed on Apr. 27, 2016, provisional application No. 62/166,155, filed on May 26, 2015.

(51) Int. Cl.
  *G06K 9/46* (2006.01)
  *G01N 1/30* (2006.01)

(56) References Cited

U.S. PATENT DOCUMENTS

| | | | |
|---|---|---|---|
| 2011/0026803 A1* | 2/2011 | Can | G06T 5/004 382/133 |
| 2012/0076406 A1* | 3/2012 | Fisher | G06K 9/0063 382/168 |
| 2013/0268465 A1* | 10/2013 | McConnell | G06K 9/0063 706/12 |
| 2013/0311136 A1* | 11/2013 | Blonshine | G16C 20/20 702/180 |
| 2015/0119708 A1* | 4/2015 | Sachse | A61B 5/0071 600/431 |
| 2015/0245882 A1* | 9/2015 | Venkatraghavan | A61B 6/503 600/424 |

OTHER PUBLICATIONS

International Search Report and Written Opinion, dated Dec. 1, 2019.

Taylor CR et al: "Quantification of immunohistochemistry—issues concerning methods, utility and semiquantitative assessment II", Histopathology, Wileyblackwell Publishing Ltd, GB, vol. 49, No. 4, Oct. 2006, pp. 411-424.

P Smitha et al: "Quality enhancement technique for gray level immunohistochemistry images", 2014 IEEE International Conference on Computational Intelligence and Computing Research, Dec. 2014.

Allan Gray et al: "Quantification of histochemical stains using whole slide imaging: development of a method and demonstration of its usefulness in laboratory quality control", Journal of Clinical Pathology, vol. 68, No. 3, 5 Dec. 2014, pp. 192-199.

Dashan Gao et al: "Automated Training Data Generation for Microscopy Focus Classification", Sep. 20, 2010, Medical Image Computing and Computer-Assisted Intervention, pp. 446-453.

* cited by examiner

Break-apart ISH/FISH

Acceptable　　　　　　　　Unacceptable

Amplification ISH/FISH

Acceptable　　　　　　　　Unacceptable

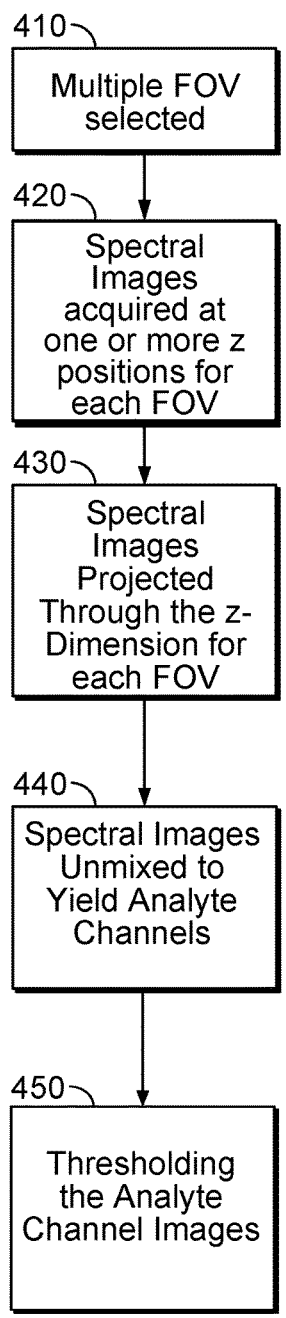
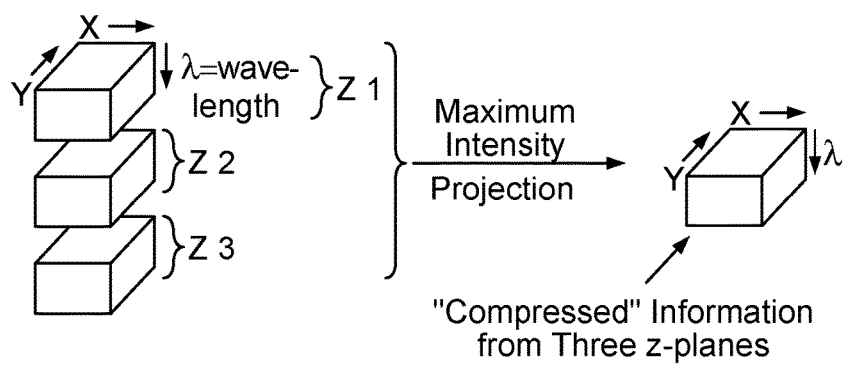
FIG. 4B
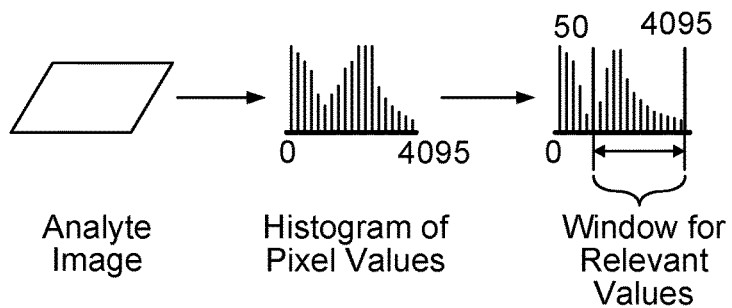
FIG. 4C
FIG. 4A

DESCRIPTIVE MEASUREMENTS AND QUANTIFICATION OF STAINING ARTIFACTS FOR IN SITU HYBRIDIZATION

CROSS REFERENCE TO RELATED APPLICATIONS

This patent application is a continuation of International Patent Application No. PCT/EP2016/061859 filed May 25, 2016, which claims priority to and the benefit of the filing date of U.S. Provisional Patent Application No. 62/328,041 filed Apr. 27, 2016, and the benefit of the filing date of U.S. Provisional Patent Application No. 62/166,155 filed May 26, 2015, the disclosures of which are hereby incorporated herein by reference in their entireties.

BACKGROUND OF THE DISCLOSURE

Immunohistochemistry (IHC) refers to the processes of detecting, localizing, and/or quantifying antigens, such as a protein, in a biological sample using antibodies specific to the particular antigens. IHC provides the substantial advantage of identifying exactly where a particular protein is located within the tissue sample. It is also an effective way to examine the tissues themselves. In situ hybridization (ISH) refers to the process of detecting, localizing, and quantifying nucleic acids. Both IHC and ISH can be performed on various biological samples, such as tissue (e.g. fresh frozen, formalin fixed, paraffin embedded) and cytological samples. Recognition of the targets can be detected using various labels (e.g., chromogenic, fluorescent, luminescent, radiometric), irrespective of whether the target is a nucleic acid or an antigen.

To robustly detect, locate, and quantify targets in a clinical setting, amplification of the recognition event is desirable as the ability to confidently detect cellular markers of low abundance becomes increasingly important for diagnostic purposes. For example, depositing at the marker's site hundreds or thousands of label molecules in response to a single antigen detection event enhances, through amplification, the ability to detect that recognition event. Adverse events often accompany amplification, such as non-specific signals that are apparent as an increased background signal. An increased background signal may interfere with the clinical analysis by obscuring faint signals that may be associated with low, but clinically significant, expressions.

Despite efforts to restrict labeling to the target sequence of interest in ISH, anomalous non-specific localization of the detection reagent or DNA probe may occur due to a variety of causes, such as inconsistent performance of staining instruments, instability of reagents and loss of specific binding activity or aggregation, inappropriate staining protocols, and contamination of the slide. The same issues may apply to samples stained with chromogens, fluorophores, and/or quantum dots.

For commercial in-vitro diagnostic ISH assays, the staining performance, e.g. stain uniformity, stain intensity, or background staining, must be validated to deliver sensitive and specific staining to the sequences of interest, with a high degree of repeatability. For this reason, specifications that define the various factors that influence acceptable performance of ISH assays must be developed and documented.

Current methods for ISH performance specifications are based primarily on subjective impressions of various factors recorded on a scale that is developed to aid in statistical measurement over a large number of slides. Such subjective scoring is generally achieved through direct inspection of slides through the oculars of a brightfield or fluorescent microscope. Human perception is largely comparative, and the subjective scoring methods in use cannot be defined to precise standards because of the influence of experience, visual acuity, and understanding of the scaling system being used in a particular context.

In current practice, there are at least three subjective measurements that are weighed in determining overall stain quality assessment for ISH: (i) intensity (or contrast) of the stain localizations, (ii) coverage (the percentage of potential available hybridization sites that exhibit signal), and (iii) background (non-specific localization of signal, due to adherence of either the reporter (quantum dot and conjugated antibody) or adherence of the DNA probe itself. Thus, it is difficult to compare slide-to-slide variation and nearly impossible to define concrete specifications for staining performance.

The aim of the present invention is therefore to provide a means for assessing the stain quality in the fields of in-situ hybridization and immunohistochemistry and to provide a means for establishing objective criteria for assessing the stain quality for in-situ hybridization and immunohistochemistry.

SUMMARY OF THE DISCLOSURE

Immunohistochemistry (IHC) and in situ hybridization (ISH) have the aim of detecting, localizing and quantifying certain analytes for diagnostic purposes. The quality of the stains which are analyzed may deviate for various reasons. The present invention provides a method and system for assessing the stain quality and for establishing objective criteria for assessing the stain quality for application in the fields of in-situ hybridization and immunohistochemistry.

An embodiment of the invention comprises the steps of unmixing multi-spectral image data of a tissue specimen to obtain analyte intensity images, each analyte intensity image comprising signals from a single stain, computing metrics based on the analyte intensity images, wherein the metrics are uniformity, distribution and/or dispersion of pixel intensity values in the analyte intensity images and assessing a stain quality of a slide by comparing the computed metrics to pre-determined cutoff values regarding uniformity, distribution and/or dispersion of pixel intensity, wherein the stain quality of the slide is assessed as acceptable if the computed metrics meet or exceed the pre-determined cutoff values, and wherein the stain quality of the slide is assessed as unacceptable if the computed metrics do not meet the pre-determined cutoff values. In order to establish objective criteria for assessing stain quality, in one possible embodiment, the method and system includes the step of deriving cut-off values regarding uniformity, distribution and/or dispersion of pixel intensity by combining the computed metrics based on the analyte intensity images with pre-established rating data quantifying the stain quality.

In accordance with embodiments of the invention there is provided a method for assessing the stain quality for application in in-situ hybridization and immunohistochemistry. In one possible embodiment, this method comprises the steps of unmixing multi-spectral image data of a tissue specimen to obtain analyte intensity images, each analyte intensity image comprising signals from a single stain, computing metrics based on the analyte intensity images, wherein the metrics are uniformity, distribution and/or dispersion of pixel intensity values in the analyte intensity images and assessing a stain quality of a slide by comparing the computed metrics to pre-determined cutoff values regarding uniformity, distribution and/or dispersion of pixel intensity. Herein, the stain quality of the slide is assessed as acceptable if the computed metrics meet or exceed the pre-determined cutoff values, and the stain quality of the slide is assessed as unacceptable if the computed metrics do not meet the pre-determined cutoff values.

According to an embodiment of the present invention, in a first step, the multi-spectral image data are unmixed. In general, the unmixing process extracts stain-specific or analyte specific channels to determine local concentrations of individual stains using reference spectra that are well known for standard types of tissue and stain combinations. Therefore, via the unmixing step, intensity images may be derived for different types of analytes which are simultaneously present in the analysed slide. In a further step, various computing metrics are applied to the analyte intensity image. These metrics pertain to the uniformity, distribution and/or dispersion of pixel intensity. As has been found, these three metrics are suitable for determining the stain quality of a slide. According to the present invention, it is preferable if all three metrics are applied for assessing stain quality.

The computed metrics are compared to predetermined cutoff values. These cutoff values may have been determined manually. These cutoff values may also have been determined in an automated manner, which is also a subject of the present invention. If the computed metrics meet or exceed the predetermined cutoff values, the stain quality of the slide is acceptable. This indicates that the slide is suitable for diagnostic work.

According to an embodiment of the present invention, it is preferable that the metrics of uniformity and distribution of pixel intensity values in the analyte intensity images are derived via an entropy calculation. In addition, it is preferable that the metric of dispersion of pixel intensity value in the analyte intensity images is derived via calculation of mean-variance values. These methods have been found highly suitable for providing accurate results regarding the uniformity, distribution and dispersion to be found in analyte intensity images.

Preferably, the entropy calculation is performed as follows. In a first step, image histograms of intensity values are derived from each of the analyte intensity images. In a second step, a probability that a pixel sampled from an analyte intensity image has a particular value in the respective histogram is calculated. For this purpose, intensity values may be derived by sorting pixels from each analyte intensity images into bins.

According to an embodiment, the probability that a pixel sampled from an analyte intensity image has a particular value in the respective histogram is calculated by summing a total number of pixels in all bins of the derived histogram to provide a total number of pixels in that derived histogram, dividing a number of pixels in each bin of the histogram by the total number of pixels in the histogram to provide a probability of a pixel belonging within a particular bin, multiplying each probability of a pixel belonging within a particular bin by the logarithm to the base of 2 of the probability to provide a value in bits, and summing the values in bits. Thus, the entropy value may be derived.

Besides the calculation of the entropy value, the calculation of the mean-variance ratio values is highly important, as it may be used for determining the dispersion of the pixel intensity values in the analyte intensity images. The mean-variance ratio values are computed by deriving image histograms of intensity values from each of the analyte intensity images and calculating a ratio of a measured intensity mode value and a measured intensity variance value from the derived histograms.

The method as described may have applications in immunohistochemistry as well as in situ hybridization. The stains may be selected from the group consisting of quantum dots, fluorophores, enzyme-deposited fluorophores and chromogens.

According to an embodiment of the present invention, the multi-spectral image data may be derived from a spectral cube (also referred to as an image cube or hyperspectral cube to those of ordinary skill in the art). A spectral cube contains the image data along two axes, and the wavelength data at a third axis. Therefore, the spectral cube represents all the relevant input data required for the process of unmixing the image data.

The underlying problem which necessitates unmixing is that different stains may cause an increase in intensity at overlapping wavelengths. Therefore, unmixing aims to retrieve the intensity of each separate stains, accounting for the fact that the intensity of certain wave lengths may have been elevated by multiple stains. According to the present invention, this problem should preferably be solved by applying a linear least squares algorithm, which is known to those of ordinary skill in the art.

In one embodiment of the present invention, the analyte intensity images are thresholded prior to computing the entropy values and mean-variance ration values. This operation restricts analysis of signals to a consistent part of the dynamic range of the data acquired and avoids the inclusion of pixel values that are not relevant to the signal localization.

The aim of the present invention is also achieved by a system for assessing the stain quality for application in in-situ hybridization and immunohistochemistry, which is configured for executing the steps as previously described. In one possible embodiment, this system comprises a computer or workstation for performing the relevant calculations on image data. Preferably, the system comprises an imaging apparatus. According to a preferred embodiment, this imaging apparatus is a multi-spectral imaging system.

In one possible embodiment, the aim of the present invention is achieved by a method for establishing objective criteria for assessing the stain quality for application in in-situ hybridization and immunohistochemistry, comprising the steps of selecting a set of reference slides and obtaining multi-spectral image data for each reference slide, wherein each reference slide is annotated with rating data quantifying the stain quality, unmixing multi-spectral image data of a tissue specimen to obtain analyte intensity images, each analyte intensity image comprising signals from a single stain, computing metrics based on the analyte intensity images, wherein the metrics are uniformity, distribution and dispersion of pixel intensity values in the analyte intensity images and deriving cutoff values for uniformity, distribution and/or dispersion of pixel intensity for assessing the stain quality by combining the computed metrics based on the analyte intensity images and the rating data quantifying the stain quality.

This implies that according to this embodiment, image data is obtained from multiple reference slides and subsequently, the steps of unmixing and application of the relevant metrics are performed. Therein, it is preferable that the metrics of uniformity and distribution of pixel intensity values in the analyte intensity images are derived via an entropy calculation. In addition, it is preferable if the metric of dispersion of pixel intensity value in the analyte intensity images is derived via calculation of mean-variance values.

These methods have been found highly suitable for providing accurate results regarding the uniformity, distribution and dispersion to be found in analyte intensity images.

After these metrics have been computed, cutoff values regarding uniformity, distribution and/or dispersion of pixel intensity are automatically derived. In order to be able to establish these cutoff values, rating data for each reference slide is taken into account. This rating data has been established before application of the present method. For instance, each slide may have been identified as having acceptable or unacceptable stain quality as judged by a pathologist or other medical professional.

Preferably, the cutoff values are established by methods of machine learning. According to one particular embodiment, the cutoff values are derived by applying a support vector machine, lower discriminant analysis and/or a logistic regression.

In another embodiment, the invention also includes a system for establishing objective criteria for assessing the stain quality for in-situ hybridization and immunohistochemistry, wherein the system is configured to execute the method for establishing objective criteria for assessing the stain quality for in-situ hybridization and immunohistochemistry, as previously described. The system may include a personal computer and/or a workstation. The system may also include an imaging apparatus, which is preferably a multi-spectral imaging system.

In one aspect of the present disclosure is a computer device and method for stain assessment. In general, the computer device is configured to receive image data from a tissue specimen having one or more detectable stains or analytes therein; unmix the image data to obtain analyte intensity images, each analyte intensity image corresponding to a different image channel (e.g. an image channel corresponding to a particular stain or analyte); compute metrics from the analyte intensity images; and evaluate the computed metrics to (i) establish objective criteria for staining performance (e.g. cutoff values for a particular assay or set of stains); (ii) assess a stain quality of a slide given predetermined cutoff values; or (iii) qualify staining inconsistencies (e.g. "root cause analysis"). In some embodiments, the image data is multi-spectral image data and the tissue specimen was stained in a multiplex assay.

In another aspect of the present disclosure is a computer device for objective stain assessment comprising one or more processors and at least one memory, the at least one memory storing non-transitory computer-readable instructions for execution by the one or more processors to cause the one or more processors to: (i) unmix multi-spectral image data of a tissue specimen to obtain analyte intensity images, each analyte intensity image comprising signals from a single stain (e.g. the stains may be chromophores, fluorophores, quantum dots, etc. and the tissue may have been stained in an IHC and/or ISH assay); (ii) compute metrics based on the analyte intensity images, wherein the metrics are entropy values and mean-variance ratio values; and (iii) assess a stain quality of a slide by comparing the computed metrics to pre-determined cutoff values (e.g. predetermined entropy cutoff values, predetermined mean-variance ratio cutoff values, etc.), wherein the stain quality of the slide is assessed as acceptable if the computed metrics meet or exceed the pre-determined cutoff values, and wherein the stain quality of the slide is assessed as unacceptable if the computed metrics do not meet the pre-determined cutoff values (where the terms 'acceptable' and 'unacceptable' are as defined herein). In some embodiments, the predetermined cutoff values are specific to a particular assay or to particular detectable stains or analytes. In embodiments where the stain quality is determined to be unacceptable, instructions are provided to determine the root cause of any staining inconsistencies (e.g. to determine whether the root cause was due to a deficiency in scanning or due to a deficiency in staining). In some embodiments, the staining quality is an assessment of the uniformity of a stain. In some embodiments, the staining quality is an assessment of anomalous background staining. In some embodiments, the staining quality is an assessment of the uniformity of a stain and an assessment of an amount of anomalous backgrounds staining.

In some embodiments, the entropy values are computed by (i) deriving image histograms of intensity values from each of the analyte intensity images, and (ii) calculating a probability that a pixel sampled from an analyte intensity image has a particular value in the respective histogram. In some embodiments, the image histograms of intensity values are derived by sorting pixels from each analyte intensity image into bins. In some embodiments, the probability that a pixel sampled from an analyte intensity image has a particular value in the respective histogram is calculated by (i) summing a total number of pixels in all bins of the derived histogram to provide a total number of pixels in that derived histogram; (ii) dividing a number of pixels in each bin of the histogram by the total number of pixels in the histogram to provide a probability of a pixel belonging within a particular bin; (iii) multiplying each probability of a pixel belonging within a particular bin by the logarithm to the base of 2 of the probability to provide a value in bits; and (iv) summing the values in bits.

In some embodiments, the mean-variance ratio values are derived by (i) deriving image histograms of pixel intensity values from each of the analyte intensity images, and (ii) calculating a ratio of a measured pixel intensity mode value and a measured pixel intensity variance value from the derived histograms. In some embodiments, the pixel intensity mode value represents the pixel intensity value that occurs most often in a particular histogram. In some embodiments, the pixel intensity variance value represents a value of how spread apart certain pixel intensities are in a histogram.

In some embodiments, the one or more detectable analytes are selected from the group consisting of quantum dots, fluorophores, enzyme-deposited fluorophores and chromogens. In some embodiments, the tissue samples are stained in a fluorescence in situ hybridization assay (FISH). In some embodiments, the tissue sample is stained in a FISH assay with one or more quantum dots. In some embodiments, the tissue sample is stained in a FISH assay to detect a chromosomal breakpoint. In some embodiments, the multi-spectral image data is unmixed by applying a linear least squares algorithm. In some embodiments, the analyte intensity images are thresholded prior to metric computation.

In some embodiments, the multi-spectral image data comprises scanned images of a stained tissue specimen, e.g. specimens mounted on a slide. In some embodiments, spectral images of the tissue sample are taken at several axial positions. In some embodiments, the scanned images are combined into a spectral cube (also referred to as an image cube or hyperspectral cube to those of ordinary skill in the art). In some embodiments, the tissue samples were stained in a multiplex IHC and/or ISH assay for the detection of biomarkers therein.

In another aspect of the present disclosure is a computer device for objective stain assessment comprising one or more processors and at least one memory, the at least one memory storing non-transitory computer-readable instructions for execution by the one or more processors to cause the one or more processors to: unmix a multi-spectral image of a tissue specimen to obtain analyte intensity images; compute metrics based on the analyte intensity images, wherein a first metric is a numerical descriptor of the uniformity and distribution of pixel intensity values in the analyte intensity images, and wherein a second metric is a numerical descriptor of the dispersion of pixel intensity values in the analyte intensity images, the pixel intensity values corresponding to signals from a detectable stain in each analyte intensity image; assess a stain quality of a slide by comparing the computed metrics to pre-determined cutoff values, wherein the stain quality of the slide is assessed as acceptable if the computed metrics meet or exceed the pre-determined cutoff values, and wherein the stain quality of the slide is assessed as unacceptable if the computed metrics do not meet the pre-determined cutoff values. In embodiments where the stain quality is determined to be unacceptable, instructions are provided to determine the root cause of any staining inconsistencies (e.g. to determine whether the root cause was due to a deficiency in scanning or due to a deficiency in staining). In some embodiments, images deemed unacceptable are re-scanned and stain quality is again assessed. In some embodiments, the staining quality is an assessment of the uniformity of a stain. In some embodiments, the staining quality is an assessment of anomalous background staining. In some embodiments, the staining quality is an assessment of the uniformity of a stain and an assessment of an amount of anomalous backgrounds staining.

In some embodiments, the entropy values are computed by (i) deriving image histograms of intensity values from each of the analyte intensity images, and (ii) calculating a probability that a pixel sampled from an analyte intensity image has a particular value in the respective histogram. In some embodiments, the image histograms of intensity values are derived by sorting pixels from each analyte intensity images into bins. In some embodiments, the probability that a pixel sampled from an analyte intensity image has a particular value in the respective histogram is calculated by (i) summing a total number of pixels in all bins of the derived histogram to provide a total number of pixels in that derived histogram; (ii) dividing a number of pixels in each bin of the histogram by the total number of pixels in the histogram to provide a probability of a pixel belonging within a particular bin; (iii) multiplying each probability of a pixel belonging within a particular bin by the logarithm to the base of 2 of the probability to provide a value in bits; and (iv) summing the values in bits.

In some embodiments, the mean-variance ratio values are derived by (i) deriving image histograms of intensity values from each of the analyte intensity images, and (ii) calculating a ratio of a measured pixel intensity mode value and a measured pixel intensity variance value from the derived histograms. In some embodiments, the one or more detectable analytes are selected from the group consisting of quantum dots, fluorophores, enzyme-deposited fluorophores and chromogens. In some embodiments, the pre-determined cutoff values are stored in the non-transitory memory. In some embodiments, a database stores predetermined cutoff values for different assays and/or different detectable analytes. In some embodiments, the analytes being detected comprise one or more quantum dots, fluorophores, enzyme-deposited fluorophores or chromogenic stains, or any combination thereof.

In another aspect of the present disclosure is a computer device for objective stain assessment comprising one or more processors and at least one memory, the at least one memory storing non-transitory computer-readable instructions for execution by the one or more processors to cause the one or more processors to: unmix multi-spectral image data of a tissue specimen stained in an immunohistochemical assay or an in situ hybridization assay for the presence of a particular biomarker to obtain analyte intensity images, each analyte intensity image comprising signals from a single stain; compute entropy values for each of the analyte intensity images by (i) deriving image histograms of intensity values from each of the analyte intensity images, and (ii) calculating a probability that a pixel sampled from an analyte intensity image has a particular value in the respective histogram; compute mean-variance ratios for each of the analyte intensity images by (i) deriving image histograms of intensity values from each of the analyte intensity images, and (ii) calculating a ratio of a measured intensity mode value and a measured intensity variance value from the intensity histograms, and assess a uniformity of a stain and/or the presence of anomalous background staining by comparing the computed entropy and mean-variance ratio values to pre-determined entropy cutoff values and mean-variance ratio cutoff values, wherein the uniformity of the stain and/or the presence of anomalous background staining is assessed as acceptable if the computed entropy and mean-variance ratio values meet or exceed the pre-determined cutoff values, and wherein the uniformity of the stain and/or the presence of anomalous background staining is assessed as unacceptable if the computed entropy and mean-variance ratio values do not meet the pre-determined cutoff values.

In another aspect of the present disclosure is a system (e.g. an analyzer) comprising an imaging apparatus (e.g. a multi-spectral imaging system) and a computer device for stain assessment, as described herein.

In another aspect of the present disclosure is a computer-implemented method of stain assessment comprising: unmixing multi-spectral image data to obtain analyte intensity images, the analyte intensity images each comprising a single image channel corresponding to signals from a particular stain; computing entropy values for each of the analyte intensity images; computing mean-variance ratios for each of the analyte intensity images; and assessing a stain quality of a slide by comparing the computed entropy and mean-variance ratio values to pre-determined entropy cutoff values and mean-variance ratio cutoff values, wherein a stain quality is assessed as acceptable if the computed entropy and mean-variance ratio values meet or exceed the pre-determined cutoff values, and wherein the stain quality is assessed as unacceptable if the computed entropy and mean-variance ratio values do not meet the pre-determined cutoff values.

In some embodiments, the entropy values are computed by (i) deriving image histograms of intensity values from each of the analyte intensity images, and (ii) calculating a probability that a pixel sampled from an analyte intensity image has a particular value in the respective histogram. In some embodiments, the image histograms of intensity values are derived by sorting pixels from each analyte intensity image into bins. In some embodiments, the probability that a pixel sampled from an analyte intensity image has a particular value in the respective histogram is calculated by (i) summing a total number of pixels in all bins of the derived histogram to provide a total number of pixels in that derived histogram; (ii) dividing a number of pixels in each bin of the histogram by the total number of pixels in the histogram to provide a probability of a pixel belonging within a particular bin; (iii) multiplying each probability of a pixel belonging within a particular bin by the logarithm to the base of 2, of the probability to provide a value in bits; and (iv) summing the values in bits.

In some embodiments, the mean-variance ratio values are derived by (i) deriving image histograms of intensity values from each of the analyte intensity images, and (ii) calculating a ratio of a measured pixel intensity mode value and a measured pixel intensity variance value from the derived histograms. In some embodiments, the one or more detectable analytes are selected from the group consisting of quantum dots, fluorophores, enzyme-deposited fluorophores and chromogenic.

In another aspect of the present disclosure is a computer device for stain assessment comprising one or more processors and at least one memory, the at least one memory storing non-transitory computer-readable instructions for execution by the one or more processors to cause the one or more processors to (i) run an image processing module to obtain multi-spectral image data (e.g. scanned images) of a tissue specimen having one or more detectable stains analytes; (ii) run an unmixing module to unmix the multi-spectral images into analyte intensity images; (ii) run a metric computation module to derive metrics based on the analyte intensity images; and (iii) run an evaluation module to assess a stain quality by comparing the computed metrics to pre-determined cutoff values, wherein a stain quality is assessed as acceptable if the computed metrics meet or exceed the pre-determined cutoff values, and wherein a stain quality is assessed as unacceptable if the computed metrics do not meet the pre-determined cutoff values.

In some embodiments, the entropy values are computed by (i) deriving image histograms of intensity values from each of the analyte intensity images, and (ii) calculating a probability that a pixel sampled from an analyte intensity image has a particular value in the respective histogram. In some embodiments, the image histograms of intensity values are derived by sorting pixels from each analyte intensity images into bins. In some embodiments, the probability that a pixel sampled from an analyte intensity image has a particular value in the respective histogram is calculated by (i) summing a total number of pixels in all bins of the derived histogram to provide a total number of pixels in that derived histogram; (ii) dividing a number of pixels in each bin of the histogram by the total number of pixels in the histogram to provide a probability of a pixel belonging within a particular bin; (iii) multiplying each probability of a pixel belonging within a particular bin by the logarithm to the base of 2 of the probability to provide a value in bits; and (iv) summing the values in bits.

In some embodiments, the mean-variance ratio values are derived by (i) deriving image histograms of intensity values from each of the analyte intensity images, and (ii) calculating a ratio of a measured pixel intensity mode value and a measured pixel intensity variance value from the derived histograms.

In another aspect of the present disclosure is a computer device for establishing objective criteria for stain assessment comprising one or more processors and at least one memory, the at least one memory storing non-transitory computer-readable instructions for execution by the one or more processors to cause the one or more processors to: (i) unmix multi-spectral image data of a tissue specimen stained in an immunohistochemical assay or an in situ hybridization assay for the presence of a particular biomarker to obtain analyte intensity images, each analyte intensity image comprising signals from a single stain, and wherein the multi-spectral image data is from a plurality of reference slides that have been identified as acceptable or unacceptable (e.g. known reference slides that have been identified as having acceptable or unacceptable stain quality as judged by a pathologist or other medical professional); (ii) compute entropy values and mean-variance ratio values based on each of the obtained analyte intensity images (e.g. to derive entropy and mean-variance ratios for slides having acceptable stain quality and slide having unacceptable stain quality); and (iii) derive cutoff values for staining quality assessment (e.g. cutoff values that may be used in subsequent stain assessment processes) based on the computed entropy and mean-variance ratio values, wherein the cutoff values for staining quality assessment correspond to the stains used in the immunohistochemical assay and/or the in situ hybridization assay.

In some embodiments, the entropy values are computed by (i) deriving image histograms of intensity values from each of the analyte intensity images, and (ii) calculating a probability that a pixel sampled from an analyte intensity image has a particular value in the respective histogram. In some embodiments, the image histograms of intensity values are derived by sorting pixels from each analyte intensity images into bins. In some embodiments, the probability that a pixel sampled from an analyte intensity image has a particular value in the respective histogram is calculated by (i) summing a total number of pixels in all bins of the derived histogram to provide a total number of pixels in that derived histogram; (ii) dividing a number of pixels in each bin of the histogram by the total number of pixels in the histogram to provide a probability of a pixel belonging within a particular bin; (iii) multiplying each probability of a pixel belonging within a particular bin by the logarithm to the base of 2 of the probability to provide a value in bits; and (iv) summing the values in bits.

In some embodiments, the mean-variance ratio values are derived by (i) deriving image histograms of intensity values from each of the analyte intensity images, and (ii) calculating a ratio of a measured pixel intensity mode value and a measured pixel intensity variance value from the derived histograms. In some embodiments, the one or more detectable analytes are selected from the group consisting of quantum dots, fluorophores, enzyme-deposited fluorophores and chromogens. In some embodiments, the pre-determined cutoff values are stored in the non-transitory memory. In some embodiments, the analytes being detected comprise one or more quantum dots, fluorophores, enzyme-deposited fluorophores or chromogenic stains, or any combination thereof. In some embodiments, the cutoff values are derived with a support vector machine. A support vector machine is a method for pattern analysis and machine learning. It is suitable for the derivation of the desired cutoff values. However, any other suitable machine learning method may be applied to derive cutoff values, as well.

In another aspect of the present disclosure is a computer-implemented method for establishing objective criteria for stain assessment comprising: unmixing multi-spectral image data of a tissue specimen from a plurality of reference slides to obtain a series of analyte intensity images, wherein each analyte intensity image comprises signals from a single stain, and wherein the reference slides have each been identified as acceptable or unacceptable; computing entropy values and mean-variance ratio values based on each of the obtained analyte intensity images; and deriving cutoff values for staining quality assessment based on the computed entropy and mean-variance ratio values, wherein the cutoff values for staining quality assessment correspond to the stains used in the immunohistochemical assay and/or the in situ hybridization assay.

In some embodiments, the entropy values are computed by (i) deriving image histograms of intensity values from each of the analyte intensity images, and (ii) calculating a probability that a pixel sampled from an analyte intensity image has a particular value in the respective histogram. In some embodiments, the image histograms of intensity values are derived by sorting pixels from each analyte intensity images into bins. In some embodiments, the probability that a pixel sampled from an analyte intensity image has a particular value in the respective histogram is calculated by (i) summing a total number of pixels in all bins of the derived histogram to provide a total number of pixels in that derived histogram; (ii) dividing a number of pixels in each bin of the histogram by the total number of pixels in the histogram to provide a probability of a pixel belonging within a particular bin; (iii) multiplying each probability of a pixel belonging within a particular bin by the logarithm to the base of 2 of the probability to provide a value in bits; and (iv) summing the values in bits. In some embodiments, the mean-variance ratio values are derived by (i) deriving image histograms of intensity values from each of the analyte intensity images, and (ii) calculating a ratio of a measured pixel intensity mode value and a measured pixel intensity variance value from the derived histograms.

The present invention provides an improved system and method of evaluating stain quality, as described herein. In fact, the present invention provides processes of computing metrics that serve (a) as a determinant for the development of objective indicia for stain quality assessment, and (b) as a means for objectively determining whether a particular slide meets staining performance standards by comparing the computed metrics to predetermined cutoff values for the analytes being detected. The presently disclosed methods allow for superior assessment methods as compared with state-of-the art techniques used by pathologists and those which rely solely on subjective criteria. The presently disclosed methods do not rely on the subjective interpretations of pathologists and the use of developed objective criteria, specific for a particular assay, tissue sample, detectable analyte, and/or processing method, allows for consistent and repeatable assessments to be made that are repeatable and less prone to error. Moreover, the methods disclosed herein allow (1) the reporting of stain localization in terms of descriptive statistics that reflect the spatial distribution of signal intensities, (2) provide an indication of anomalous background staining or other artifacts (e.g. speckling), and/or (3) distinguish differences between stain distributions and uniformity. The present disclosure enables a method of evaluating stain quality for ISH/FISH assays and also enables the identification of specifications for acceptable stain distribution.

INDUSTRIAL APPLICABILITY

The present disclosure has industrial applicability in the field of diagnostics.

BRIEF DESCRIPTION OF DRAWINGS

FIG. 4A provides a flowchart illustrating the steps of image processing;

FIG. 4B provides a representation of the combination of data from several z-positions into a spectral cube;

FIG. 4C provides an example of thresholding;

DESCRIPTION OF EMBODIMENTS

Figure 1:
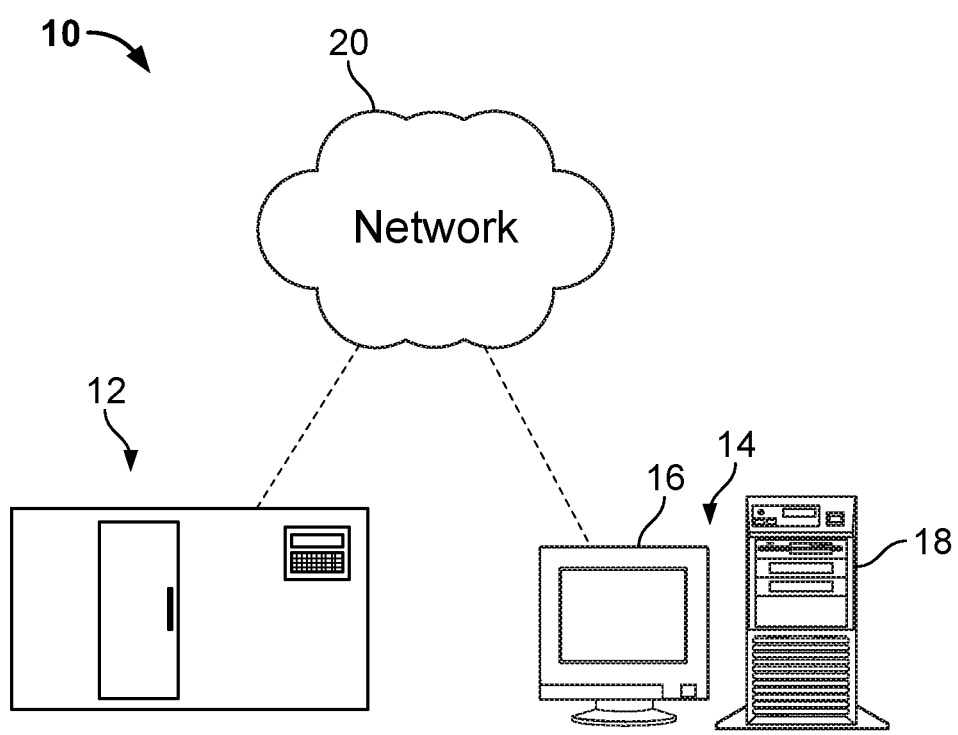
FIG. 1 shows a computer-based system for analyzing specimens in accordance with an embodiment of the disclosed technology.

In general, the present disclosure pertains to computer devices and methods for objectively assessing stain quality or for developing objective criteria for assessing the staining quality of a tissue specimen. The devices and methods described herein provide comparatively superior results to subjective techniques currently utilized by pathologists and trained medical professionals.

Definitions

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein, the term a "biological sample" can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample, such as one of the disclosed cell pellet section samples. In other examples, a sample is a test sample. Samples can be prepared using any method known in the art by a person of ordinary skill. The samples can be obtained from a subject for routine screening or from a subject that is suspected of having a disorder, such as a genetic abnormality, infection, or a neoplasia. The described embodiments of the disclosed method can also be applied to samples that do not have genetic abnormalities, diseases, disorders, etc., referred to as "normal" samples. Samples can include multiple targets that can be specifically bound by one or more detection probes.

As used herein, the term "chromophore" refers to a molecule or a part of a molecule responsible for its color. Color arises when a molecule absorbs certain wavelengths of visible light and transmits or reflects others. A molecule having an energy difference between two different molecular orbitals falling within the range of the visible spectrum may absorb visible light and thus be aptly characterized as a chromophore. Visible light incident on a chromophore may be absorbed thus exciting an electron from a ground state molecular orbital into an excited state molecular orbital.

As used herein, the terms "multiplex," "multiplexed," or "multiplexing" refer to detecting multiple targets in a sample concurrently, substantially simultaneously, or sequentially. Multiplexing can include identifying and/or quantifying multiple distinct nucleic acids (e.g., DNA, RNA, mRNA, miRNA) and polypeptides (e.g., proteins) both individually and in any and all combinations.

As used herein, the term "spectral cube" refers to data aligned along three dimensions. Two of the dimensions are the 'x' and 'y' coordinates of an image field of view and the third dimension is wavelength.

As used herein, the term "target" refers to any molecule for which the presence, location and/or concentration is or can be determined. Examples of target molecules include proteins, nucleic acid sequences, and haptens, such as haptens covalently bonded to proteins. Target molecules are typically detected using one or more conjugates of a specific binding molecule and a detectable label.

An "unmixed image" as used herein encompasses a grey-value or scalar image obtained for one channel of a multi-channel image. By unmixing a multi-channel image one unmixed image per channel is obtained.

Overview

The present disclosure is directed to a computer device and computer-implemented method developed to derive metrics from analyte intensity images (unmixed, single channel images corresponding to a particular detectable analyte or stain), where the derived metrics may be used to (i) derive cutoff values to serve as objective criteria for stain assessment (as opposed to the subjective criteria currently used in the art); (ii) assess a stain quality of a particular slide by comparing derived metrics to predetermined cutoff values; or (iii) to qualify staining inconsistencies in slides whose stain quality has been deemed unacceptable.

Figure 3A:
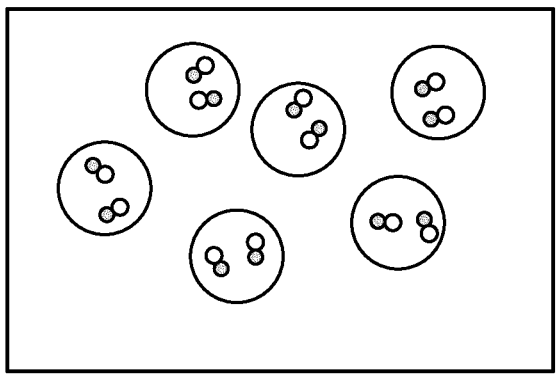
FIG. 3A illustrates the difference between acceptable and unacceptable staining of two sets of slides.
Figure 3A:
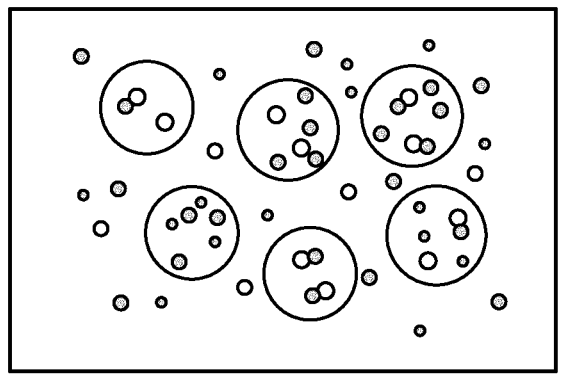
Figure 3B:
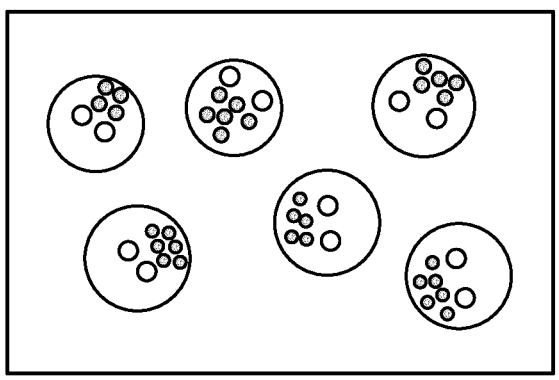
FIG. 3B illustrates the difference between acceptable and unacceptable staining of two sets of slides.
Figure 3B:
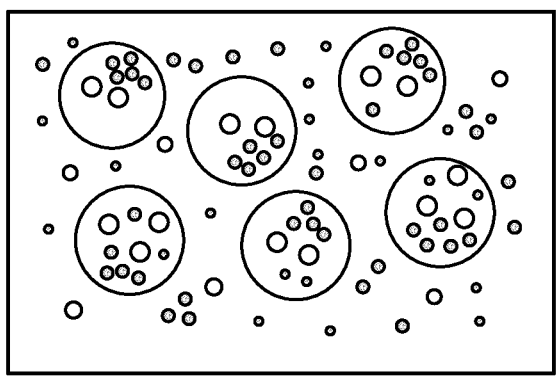
Figure 8:
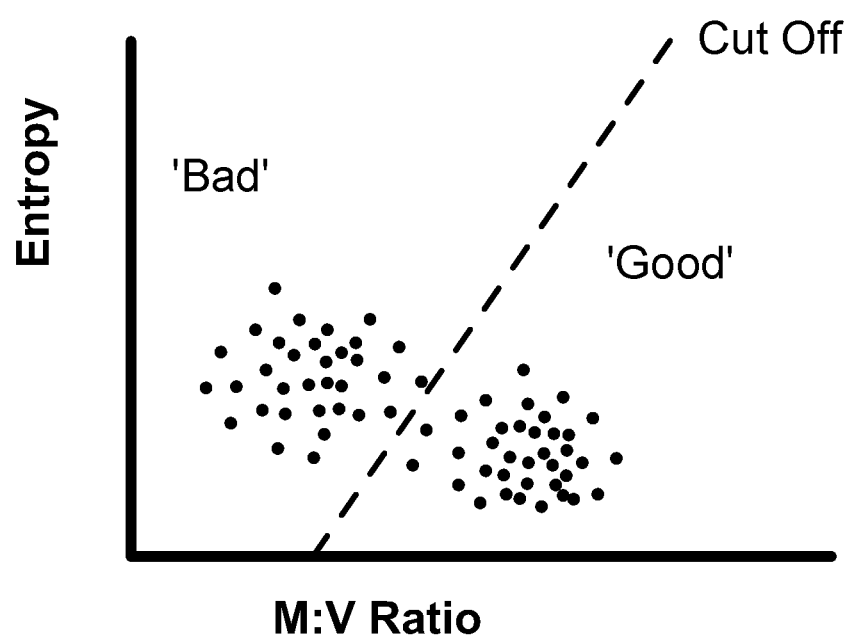
FIG. 8 illustrates a determined cutoff between acceptable and unacceptable data points.

A slide or stain quality may be referred to herein as "acceptable" or "unacceptable." As used herein, "acceptable" refers to a slide or stain quality that meets subjective performance criteria (e.g. stain uniformity/coverage, stain intensity, and non-specific background staining), as determined by an expert pathologist. "Acceptable" slides possess uniform staining and the slides do not contain anomalous background staining to a degree that would cause errors in any downstream processing or analysis. As used herein, "unacceptable" refers to a slide or stain quality that does not meet subjective performance criteria (e.g. stain uniformity/coverage, stain intensity, and non-specific background staining), as determined by an expert pathologist. Reference "acceptable" and "unacceptable" slides are used as the basis for developing correlations between the computed metrics so as to establish cutoff values for use as objective indicia for stain assessment (see FIG. 8 and the disclosures herein). FIGS. 3A and 3B illustrate the differences between "acceptable" and "unacceptable" slides, where the "unacceptable" slides contain non-specific background staining and/or other artifacts (e.g. resulting from amplification), which interfere with the ability of a skilled artisan to subjectively determine probe localizations. Slides may be determined to be "unacceptable" if the staining for probe localizations is not uniform in terms of the size, contrast and coverage, as this makes the identification of probe localizations more difficult for the skilled artisan to discern for both humans and for machine vision.

At least some embodiments of the technology disclosed herein relate to computer systems and methods for analyzing digital images or multi-spectral image data captured from tissue samples stained with one or more stains (e.g. stains supplied to the tissue in an ISH and/or IHC assay). While specific examples herein may refer to specific tissues and/or the application of specific stains for the detection of certain markers (and hence diseases), the skilled artisan will appreciate that different tissues and different stains (or probes) may be applied to detect different markers and different diseases. Moreover, while certain embodiments and examples herein are directed to ISH or FISH assays, the skilled artisan will appreciate that the embodiments are equally applicable to IHC assays. In addition, while certain examples employ quantum dots as detectable analytes, the skilled artisan will appreciate that other detectable stains or analytes may be employed in the embodiments of the present disclosure.

A computer-based specimen analyzer (10) for analyzing specimens is shown in FIG. 1. The computer-based specimen analyzer (10) may comprise an imaging apparatus (12) and a computer (14), whereby the imaging apparatus (12) and computer may be communicatively coupled together, e.g. directly, or indirectly over a network (20). The skilled artisan will appreciate that other computer devices or systems may be utilized and that the computer systems described herein may be communicatively coupled to additional components, e.g. specimen analyzers, scanners or imaging systems, automated slide preparation equipment, etc. Some of these additional components and the various computers that may be utilized are described further herein.

In general, the imaging apparatus (12), or other image source, can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus (12) is a brightfield imaging system, a multispectral imaging (MSI) system or a fluorescent microscopy system. Additional imaging devices and systems are described further herein.

Figure 2A:
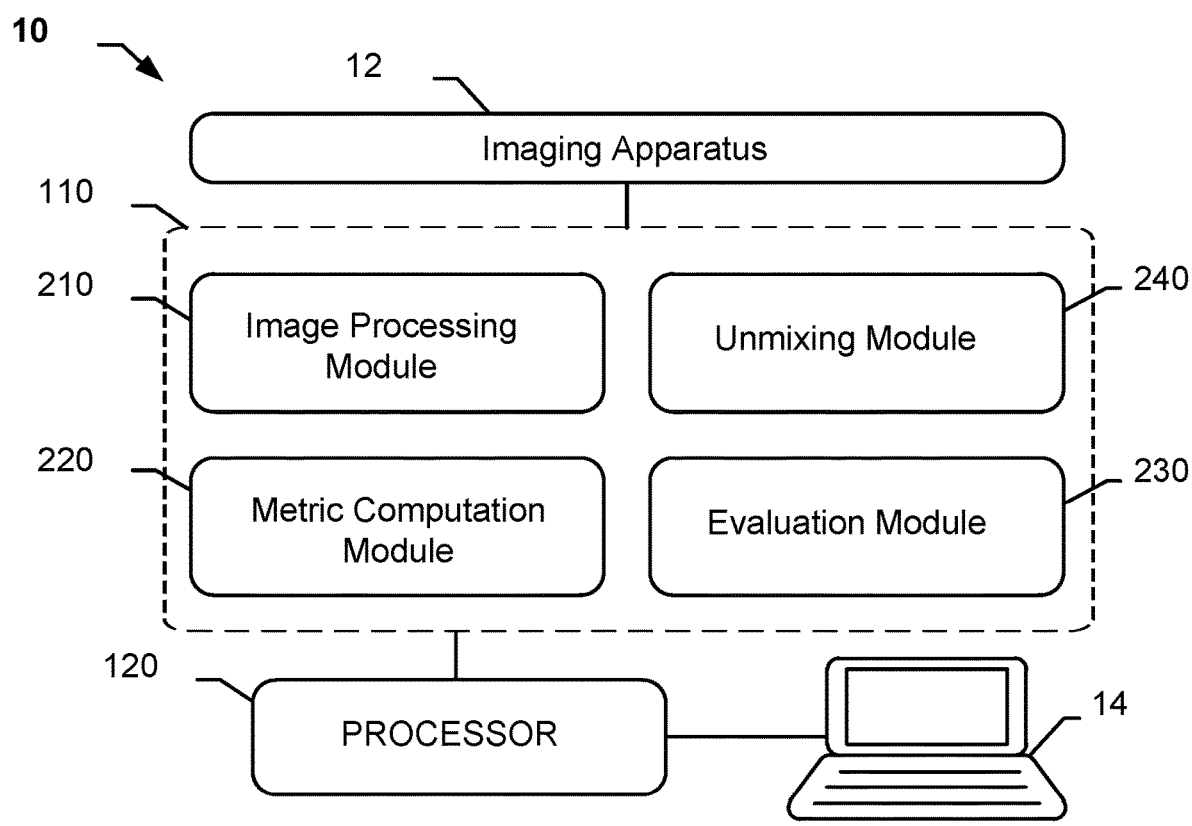
FIG. 2A illustrates a system for analyzing specimens in accordance with certain embodiments of the present disclosure.
Figure 2B:
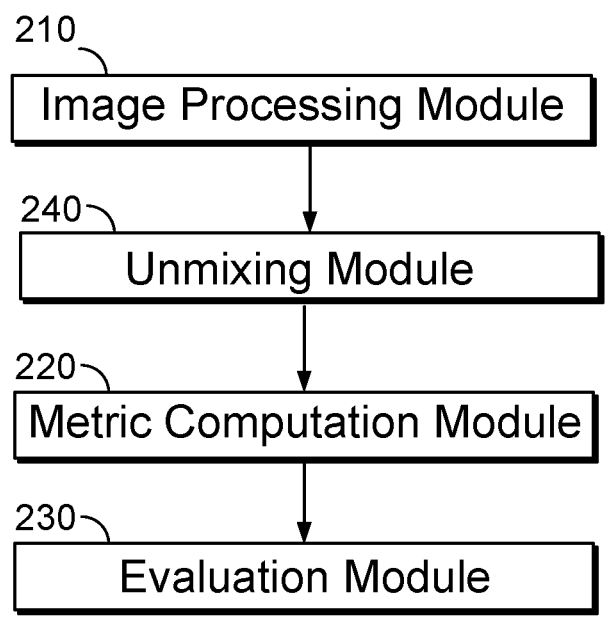
FIG. 2B provides flowchart showing an overview of the modules used within the computer-based system and method.

With reference to FIGS. 1, 2A, and 2B the computer system (14) can include a desktop computer, a laptop computer, a tablet, or the like, digital electronic circuitry, firmware, hardware, memory (110), a computer storage medium (110), a computer program (e.g. where the program is stored within the memory or storage medium), a processor (120), including a programmed processor, and/or the like. The illustrated computing system (14) of FIG. 1 may be a computer with a screen or display device (16) and an enclosure (18), e.g., a system enclosed within a tower, as depicted. The computer system can store digital images in binary form (locally, on a server, or other network connected device). The images can also be divided into a matrix of pixels. The pixels can include a digital value of one or more bits, defined by the bit depth.

Again, with reference to FIG. 1A, the network (20), in some embodiments, interconnects the imaging apparatus (12) and the computer system (14). The network (20) may include, without limitation, one or more gateways, routers, bridges, combinations thereof, or the like. The network (20) may include one or more servers and one or more websites that are accessible to users and can be used to send and receive information that the computer system (14) can utilize. A server may include, without limitation, one or more associated databases for storing information (e.g., digital images, algorithms, staining protocols, cutoff values for comparative evaluations, or the like). The network (20) may include, but is not limited to, data networks using the Transmission Control Protocol (TCP), User Datagram Protocol (UDP), Internet Protocol (IP) and other data protocols. In some embodiments, the computer device or system further comprises a display output or other means of providing data/output to a user, operator, or downstream instrument or process.

With reference to FIGS. 2A and 2B, the computer device or system (14) (or computer-implemented method) comprises one or more processors (120) and at least one memory (110), the at least one memory (110) storing non-transitory computer-readable instructions for execution by the one or more processors to cause the one or more processors to execute instructions to receive input images (12) (the input images of tissue specimens stained in an IHC and/or ISH), run an image processing module (210) to receive and/or capture image data or multi-spectral image data, run an unmixing module (240) to derive single channel analyte intensity images (the channels corresponding to the different detectable analytes in the tissue specimens), run a metric computation module (220) to derive certain numerical descriptors of stain quality, and run an evaluation module (230) to either evaluate stain quality, derive objective criteria to enable further stain quality assessments (e.g., to determine objective stain criteria for later assessment), or to evaluate a root cause of a staining inconsistency or deficiency. Each of these modules is described in greater detail herein. The skilled artisan will recognize that any of the instructions, algorithms, and filters described for use within each module may be adapted or changed based on the analytes being detected. In some embodiments, the computer device or system further comprises a display output or other means of providing data/output to a user, operator, or downstream instrument or process.

Image Acquisition and Processing

The methods described herein are developed for evaluating pure signal localizations as separated from colocalized signals with overlapping wavelength distribution (e.g. such as where multiple stains are applied in a multiplex assay). Typically, this data is acquired through means of spectral imaging technology, and the analyte intensity images (i.e. images of the pure signal localization or images representing the analyte) are obtained through unmixing of the signals in the raw spectral data (e.g., linear least-squares processing with reference data for the spectral components known a priori).

Figure 4D:
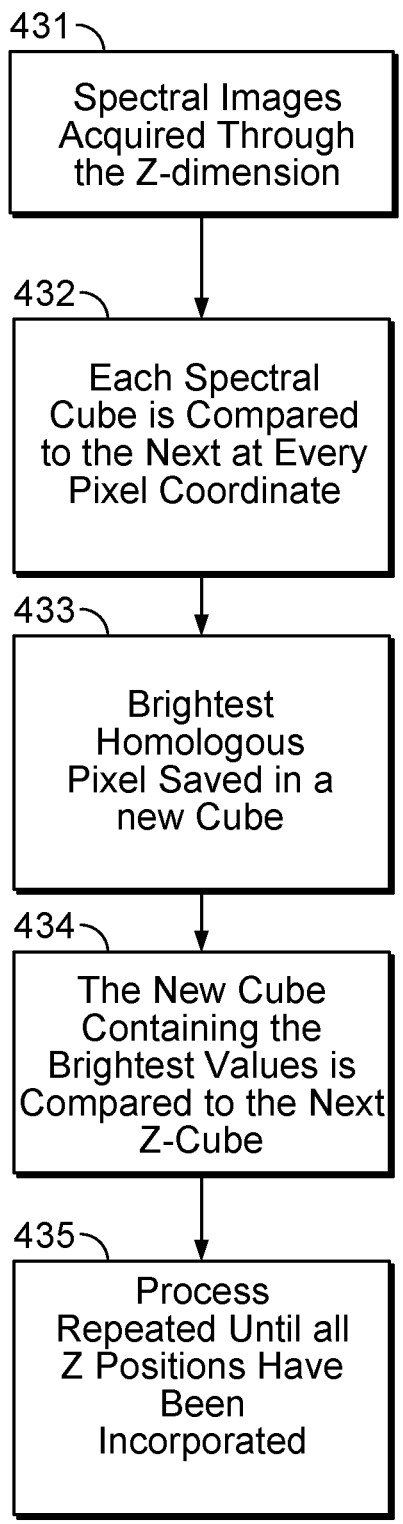
FIG. 4D provides a flowchart illustrating the steps for the generation and projection of spectral cubes.

In general, the image processing module (210) receives or captures image data, e.g. multi-spectral image data, as an input and, in conjunction with the unmixing module (240), provides analyte intensity images as output to the metric computation module (220). FIG. 4A provides a flowchart illustrating the various steps of "image processing" utilizing the image processing and unmixing modules. As described in further detail herein, multiple fields of view are first selected, step (410), and spectral images are acquired at several axial (z) positions (step (420); see also FIG. 4B). The spectral images are then projected through the z-dimension, step (430), unmixed with the unmixing module (240) to yield analyte intensity images, step (440), and optionally thresholded, step (450).

Image Processing Module

Images are acquired from a slide having a tissue specimen disposed thereon, wherein the tissue specimen has been stained (e.g. FISH with a fluorophore), and the tissue specimen thus comprises one or more detectable stains or analytes. A stain or analyte is a molecule or material that can produce a detectable (such as visually, electronically or otherwise) signal that indicates the presence and/or concentration of a label in a sample (the label indicating the approximate position of a target or biomarker). Examples of analytes and methods of "labeling" targets within a biological sample are appended herein.

The process of labeling targets within a biological sample is often spectrally multiplexed, i.e. the tissue is stained to identify multiple targets and each target identified by a different stain. For example, in a multiplex assay, the tissue sample may be stained with multiple fluorophores and/or quantum dots fluorescing at different wavelengths. As such, the images of the tissue are acquired in spectral bands that aggregately span the spectral range defined by spectral characteristics of the analyte, e.g. quantum dot or fluorescent dye/probe, used for labeling. The spectral bands may have wavelengths ranging, for example, from about 400 nm to about 900 nm. In some embodiments, spectral images are acquired at about 96 wavelengths, ranging from about 400 nm to about 800 nm.

In some embodiments, fluorescence can be measured with a multispectral imaging system such as those available from Ventana, Tucson, Ariz.; Nuance™, Cambridge Research & Instrumentation, Woburn, Mass.; or SpectraView™, Applied Spectral Imaging, Vista, Calif. Generally, MSI equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector. An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

In other embodiments, the imaging may be performed using the multispectral imaging system set forth in US Patent Publication No. 2014/0078286, to Ventana Medical Systems, Inc., which illustrates a multispectral imaging system and method, the disclosure of which is hereby incorporated herein by reference in its entirety.

Referring again to FIG. 4A, multiple fields of view (FOV) are first acquired (step 410) from a tissue sample mounted or embedded on a slide (either automated or manually, as known by those of skill in the art). In some embodiments, the number of FOV selected should be sufficient to provide adequate sampling of the tissue such that the analysis of the staining provides an accurate model of the tissue staining pattern as compared to digitizing the entire tissue section (see Gundersen, et. al, "The Efficiency of Systematic Sampling in Stereology and its Prediction," J. of Microscopy, vol. 147, pt. 3, September 1987, pp. 229-263 and Kayser et al. "Theory of Sampling and its Application in Tissue Based Diagnosis," Diagnostic Pathology, 2009, 4:6, the disclosures of which are incorporated herein by reference). In other embodiments, at least three FOVs are selected. In yet other embodiments, between about 10 to about 300 FOV are selected.

For each field of view, spectral images are taken of the tissue sample at several axial (z) positions, step (420), such as by optical sectioning. Optical sectioning is a technique of optically imaging different depth positions of a three-dimensional sample by changing the focal plane in the z-direction and taking images at each plane. See D. A. Agard, "Optical Sectioning Microscopy: Cellular Architecture in Three Dimensions," Annual Reviews in Biophysics and Bioengineering, vol. 13, pp. 191-219, 1984. S. Joshi and M. I. Miller, "Maximum a Posteriori Estimate with Good's Roughness for Three-Dimensional Optical-Sectioning Microscopy," Journal of Optical Society of America, vol. 10, no. 5, pp. 1078-1085, 1993, the disclosures of which are incorporated herein by reference. In some embodiments, a camera is operated at multiple depths (i.e. focus settings moved in the z-plane direction). In some embodiments, the z-positions are spaced at about 1.8 micron in depth of field and about 0.5 micron apart, although the skilled artisan will be able to select any appropriate spacing considering the tissue sample presented and the depth of focus for the optical system. Capturing multiple z-positions (z-planes) mitigates the effects of tissue section thickness and axial chromatic aberration.

In some embodiments the initial focal plane is determined using a filter associated with a background stain signal (e.g. DAPI, 4'-6-Diamidino-2-phenylindole). In some embodiments, a initial focal plane coordinate in x,y,z spatial dimensions is defined for multiple FOV per tissue section, and the automated acquisition subsequently collects the more lengthy spectral acquisition at three planes for each defined region.

The data from the z-positions (labeled "z" within FIG. 4A) are combined into a spectral cube that represents the data through 3-dimensional space, step (430), as known to those of ordinary skill in the art. Generally, the process of forming a spectral cube is illustrated in FIG. 4B. In some embodiments, the spectral cube denotes a virtual spectral data structure obtained through a re-sampling process of pixels in a spatial area and a spectral area. In some embodiments, the spectral cube includes spatial axes, i.e., spatial axis x and spatial axis y, and a plurality of collected images, i.e., spectral images with respect to a wavelength $\lambda$. That is, each image in the plurality of spectral images may include a length coordinate, a width coordinate, and a corresponding wavelength, e.g., emission or excitation, so the plurality of spectral images may define a three-dimensional matrix.

First, spectral images are acquired through the z-dimension, step (431). Each spectral cube is compared to the next at every pixel coordinate, step (432), and the brightest homologous pixel is saved in a new cube, step (433). The new cube containing the brightest values is compared to the next z-cube, step (434) and the process is repeated until all z-positions have been incorporated. The resulting image cube is comprised of a maximum projection through the z dimension at each wavelength, and enables faster processing with little loss of relevant information. Alternative methods of creating an extended depth of field, such as wavelet transforms, may be utilized for brightfield data instead of the simple maximum projection used for fluorescence.

Unmixing Module

After the data is acquired in multiple z-planes (x,y data at multiple z-positions) and projected through the z-dimension (raw spectral cube), step (430), it is spectrally unmixed with the unmixing module (240), see also step (440), against reference spectra to yield analyte intensity images.

Methods of unmixing are well known to those of ordinary skill in the art and any method now known or later discovered may be used to "unmix" the multi-spectral image data or images into analyte intensity images. In general, the unmixing process extracts stain-specific or analyte specific channels to determine local concentrations of individual stains using reference spectra that are well known for standard types of tissue and stain combinations. For example, each pixel in an input image may comprise a mixture of component spectra including one or more quantum dots representing target structures, in addition to broadband signals such as DAPI and autofluorescence, as described above. The unmixing may use reference spectra retrieved from a control image or estimated from the image under observation. Unmixing the component signals of each input pixel enables retrieval and analysis of stain-specific channels. The terms "unmixing" and "color deconvolution" (or "deconvolution") or the like (e.g. "deconvolving," "unmixed") are used interchangeably in the art.

In some embodiments, the multiplex images are unmixed using linear unmixing. Linear unmixing is described, for example, in 'Zimmermann "Spectral Imaging and Linear Unmixing in Light Microscopy" Adv Biochem Engin/Biotechnol (2005) 95:245-265' and in C. L. Lawson and R. J. Hanson, "Solving least squares Problems", PrenticeHall, 1974, Chapter 23, p. 161,' the disclosures of which are incorporated herein by reference in their entirety. In linear stain unmixing, the measured spectrum ($S(\lambda)$) at any pixel is considered a linear mixture of stain spectral components and equals the sum of the proportions or weights (A) of each individual fluorophore reference spectral signature ($R(\lambda)$) that is being expressed at the pixel $$S(\lambda)=A1 \cdot R1(\lambda)+A2 \cdot R2(\lambda)+A3 \cdot R3(\lambda) Ai \cdot Ri(\lambda)$$

which can be more generally expressed as in matrix form as $$S(\lambda)=\Sigma Ai \cdot Ri(\lambda) \text{ or } S=R \cdot A$$

If there are M channels images acquired and N individual fluorophores, the columns of the M×N matrix R is the known reference spectral signature of the individual fluorophores and the N×1 vector A is the unknown of the proportions of individual fluorophores and the M×1 vector S is the measured multichannel spectral vector at a pixel. In these equations, the signal in each pixel (S) is measured during acquisition of the multiplex image and the reference spectra for the known stains are usually determined in an independent offline method from fluorescent specimens labeled with only a single stain using identical instrument settings. It becomes a simple linear algebra matrix exercise to determine the contributions of various stains (Ai) by calculating their contribution to each point in the measured spectrum. In some embodiments, the solution is obtained using an inverse least squares fitting approach that minimizes the square difference between the measured and calculated spectra by solving the following set of equations, $$[\partial \Sigma j \{S(\lambda j)-Ei\ Ai \cdot Ri(\lambda j)\}2]/\partial Ai=0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems, and determining high-quality sets of reference vectors for the training assays.

In other embodiments, unmixing is accomplished using the methods described in WO2015/124772, entitled "Group Sparsity Model for Image Unmixing," filed on February 23, 215, the disclosure of which is hereby incorporated by reference in its entirety herein. In general, WO2015/124772 describes unmixing using a group sparsity framework, in which fractions of stain contributions from a plurality of colocation markers are modeled within a "same group" and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers. Moreover, WO2015/124772 describes a method of unmixing by inputting image data obtained from the biological tissue sample, reading reference data from an electronic memory, the reference data being descriptive of the stain color of each one of the multiple stains, reading colocation data from electronic memory, the colocation data being descriptive of groups of the stains, each group comprising stains that can be collocated in the biological tissue sample, and each group forming a group for the group lasso criterion, at least one of the groups having a size of two or above, and calculating a solution of the group lasso criterion for obtaining the unmixed image using the reference data as a reference matrix. In some embodiments, the method for unmixing an image may comprise generating a group sparsity model wherein a fraction of a stain contribution from colocalized markers is assigned within a single group and a fraction of a stain contribution from non-colocalized markers is assigned within separate groups, and solving the group sparsity model using an unmixing algorithm to yield a least squares solution within each group.

In addition to the linear unmixing method described above, an alternative approach for the spectral unmixing of microscopic data may be utilized, especially for datasets consisting of only few spectral channels, where the approach is based on a correlation of intensity values of a pixel in different image channels (as can be visualized in scatterplots similar to the ones used in cytofluorimetry). The unmixing is then achieved by finding the distribution angles of the desired fluorophores in the scatterplot and by orthogonalizing them into separate channels ("stretching" them onto different axes of the plot). The method in principle does not require a priori information regarding the spectra because the main distributions can be found by line fitting. (See Zimmermann, supra).

In some embodiments, the unmixed images may be limited to a certain dynamic range constraint. For example, the dynamic range may be limited by applying a thresholding filter, step (450). In some embodiments, the threshold is set to cover the entire positive spectrum range of the unmixed images (0-100% of the brightest value present with negative values clamped to a value of zero). This operation restricts analysis of signals to a consistent part of the dynamic range of the data acquired and avoids the inclusion of pixel values that are not relevant to the signal localization.

In some embodiments, thresholding, step (450), is achieved by applying an objective thresholding computation to segment "foreground" from "background" (see also FIG. 4C). For example, the Otsu thresholding method may be used to achieve this. (See Nobuyuki Otsu (1979) "A threshold selection method from gray-level histograms" IEEE Trans. Sys, Man., Cyber. 9 (1): 62-66, the disclosure of which is incorporated herein by reference in its entirety.) In other embodiments, a maximum likelihood method may be applied such as described by Kurita, T., Otsu, N., Abdelmalik, N. (1992) "Maximum Likelihood Thresholding Based On Population Mixture Models," Pattern Recognition, 25, 10:1231-1240, the disclosure of which is incorporated herein by reference in its entirety. In yet other embodiments, a threshold between about 5% and about 95% of a brightest value is applied. I is preferable to include all the pixel values greater than zero (1-100) since FISH and brightfield ISH signals are small and punctate (so it is important to exclude values of zero in addition to excluding negative values).

Metric Computation Module

After the analyte intensity images are derived from the image processing module (210), instructions are provided within the metric computation module (220) to compute metrics based on the derived analyte intensity images, where the computed metrics, in some embodiments, serve as determinants or numerical descriptors for the development of objective indicia for stain quality assessment. This is in contrast to processes typically conducted in the field of digital pathology, where the instrumentation and methods are generally geared to the recognition and/or analysis of morphological features found in images of tissue samples.

In the present disclosure, metrics are computed that (i) serve as a numerical descriptors of the uniformity of the pixel intensity values in the analyte intensity images; and (ii) serve as a numerical descriptors of the distribution of the pixel intensity values in the analyte intensity images. Two suitable metrics which may be derived are entropy values, and mean-variance ratio values, each of which are described in more detail herein. Other suitable metrics include a measurement of the variance of pixel intensities or a measurement of a standard deviation of pixel intensities. Yet another metric is a ratio of a measured mean to a measured standard deviation of pixel intensities. The metrics computed are subsequently output to the evaluation module (230), described herein.

Entropy Metric

Figure 5A:
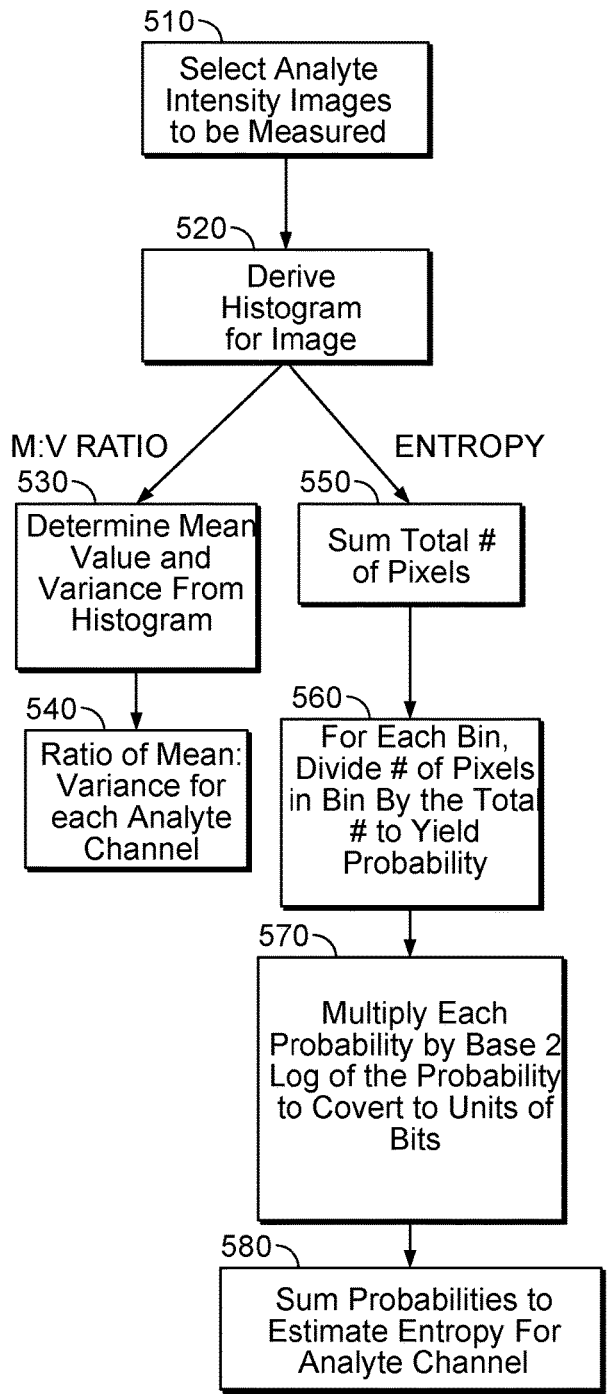
FIG. 5A provides a flowchart illustrating the steps of computing an entropy metric and a mean-variance ratio metric.

One metric of the uniformity and distribution of intensity values (i.e., how consistent pixel intensity values are with one another in the analyte intensity images) is entropy. An overview of the steps of computing an entropy metric is illustrated in FIG. 5A and described in further detail herein.

Entropy is a metric derived from information theory that describes a measure of the amount of information in a one-dimensional digital signal. The calculation of entropy is based on the probability of gaining additional information about a signal from repeated sampling. In general, the concept of information entropy describes how much randomness (or uncertainty) there is in a signal or an image. If the uncertainty is measured before and after imaging, the reduction in the uncertainty, i.e., information entropy, may serve as a quantitative measure of the information transmitted by the image. The concept of information entropy is discussed further by Tsai, et. al. "Information Entropy Measure for Evaluation of Image Quality," J Digit Imaging, 2008 Sep. 21(3):338-347, the disclosure of which is incorporated by reference herein in its entirety.

In a sense, entropy describes the degree to which the pixel intensity values are biased to a particular intensity. For example, and in the context of ISH or FISH, where the signal localizations are ideally of uniform intensity (see FIG. 6A), there is a narrow distribution of intensity values and thus lower entropy. Again, in the context of ISH or FISH, where the signal is less uniform (see FIG. 6B), there is a comparatively greater distribution of intensity values and thus higher entropy (the signal value is less biased toward a particular value). The signal may become less uniform as a result of non-specific staining by the contrast agent, or by failure of the contrast agent to reliably stain the appropriate targets, or by a combination of these two possibilities.

When assessing stain uniformity, such as in the present disclosure, the amount of uncertainty that an observer loses by sampling a pixel at random depends on the frequency of that particular value in the histogram. The reduction of uncertainty in the value of the next pixels sampled in the image can be described as:

$$H = -\sum_i p_i \log_2(p_i)$$

where H is the entropy of the image and $p_i$ represents the frequency of pixels in a given histogram bin. For practical purposes, the counts of pixel values in individual histogram bins (the histograms derived from analyte intensity images) may be used to estimate the probability of a newly sampled value (a pixel) from the image (analyte intensity image) having a value belonging to the same intensity range. For example, if all the pixels were the same intensity, then the histogram would contain all the pixels in one bin that represents the intensity. By way of example, suppose that an image is 256 pixels by 256 pixels and thus the image has 65536 pixels. If all the pixels are the same intensity (e.g., let us assume a value of 125) then a histogram representing 256 intensity values (or a dynamic range of 1:256) will have 256 bins. Bin 125 will have a frequency of 65536 because all the pixels in the image have a value of 125. All the other bins will have a frequency of 0. There is a 100% probability that a pixel sampled from this image will have a value of 125.

In some embodiments, image entropy is calculated by deriving an image histogram of intensity values and calculating the probability that a sampled pixel (i.e., a pixel sampled from an analyte intensity image) has a particular pixel intensity value in each histogram bin (of the histogram derived from the respective analyte intensity image). For instance, if there are 1000 pixels in an image, and 100 pixels within intensity bin 255, then there is a 1/10 chance of selecting a pixel that has the pixel intensity value of 255 at random. The base 2 logarithm of this probability is computed and weighted by the probability in order to compute the amount of information expected for any sampled pixel in units of bits. This consideration permits reporting of image entropy in terms of a defined unit, which here is bits.

Figure 5B:
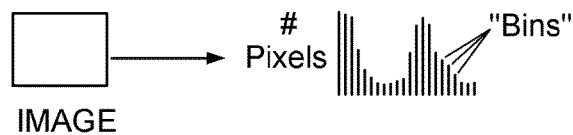
FIG. 5B illustrates an example of an intensity histogram and the number of pixels in any particular bin.
Figure 5C:
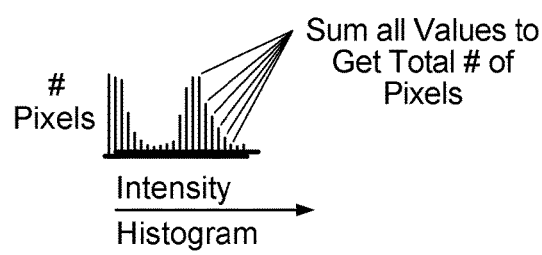
FIG. 5C illustrates the summation of all pixels in each bin of a histogram to provide a total number of pixels in an analyte intensity image from which the histogram was derived.
Figure 5D:
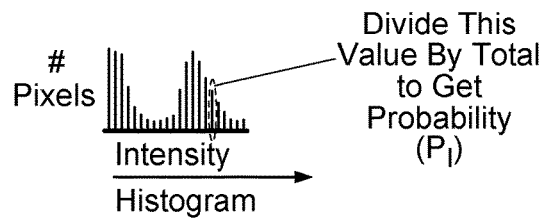
FIG. 5D illustrates the step of dividing a number of pixels in a particular bin by a total number of pixels in an analyte intensity image.

More specifically, and with reference to FIG. 5A, the analyte intensity images (and hence corresponding stain or analyte channels) to be measured are first selected, step (510). Next, an image intensity histogram is derived for each of the analyte intensity images, step (520), where the derived histogram shows the number of pixels in each bin (see FIG. 5B). The total number of pixels in all of the individual bins for each histogram is summed to provide the total number of pixels in each respective analyte intensity image step (550) (see also FIG. 5C). The number of pixels in any one particular bin is then divided by the total number of pixels in an analyte intensity image to determine the probability of that a sampled pixel belongs within a certain bin, step (560). This step is repeated for each bin (and for each of the selected channels) to provide a probability of a sampled pixel belonging in a particular bin. Each probability is then multiplied by the logarithm to the base of 2 of the probability to convert the value to a unit of bits, step (570). The probabilities are then summed to estimate the entropy for the analyte channels, step (580).

When working with images in which the pixel values have a large dynamic range, the number of bins used for computing the histogram should be taken into consideration, given that the entropy values change depending on the number of bins. In fact, when dealing with images that have a large dynamic range, the number of histogram bins may underestimate the variability of the image data if a histogram with relatively fewer bins is used. Thus, to measure small changes in entropy for a large dynamic range image, a histogram with a large number of bins (approximating the dynamic range of the image data) should be used. For example, the dynamic range may be 1:65536 (digitization of 16-bits or 65536 values). In other examples, the dynamic range may be 1:256. Of course, the skilled artisan will recognize that any dynamic range may be used and the dynamic range may be dependent upon the digitization system utilized.

Example 1, comprising the steps of selecting the analyte intensity to be measured (510), derivation of a histogram (520), summing the total number of the pixels (550), calculating the probability value for each pixel (560), converting the probability values to a unit of bits (570) and summing the probabilities to estimate the entropy for the analyte channels, as shown in FIG. 5A, provides sample pseudo-code for calculating image entropy. The skilled artisan will recognize, however, that any code may be substituted provided the resulting calculation provides the necessary entropy values for output to the evaluation module (230) such that stain quality may be assessed or that cutoff values may be derived and serve as objective criteria for staining performance.

In other embodiments, and as an alternative to determining an entropy metric, a measurement of the variance or standard deviation of pixel values in image histograms derived from analyte intensity images may be computed and serve as a numerical descriptor of the uniformity of the intensity values.

Mean to Variance Ratio Metric

In some embodiments, a metric is derived that serves as a numerical descriptor of the dispersion of the pixel intensity values for a spectrally unmixed image. In some embodiments, the metric of the dispersion of intensity values is a mean to variance ratio ("M/V Ratio"), i.e., a ratio of a mean intensity value of a signal in an image histogram to a variance value of the signal in an image histogram. In some embodiments, the pixel intensity mode value represents the pixel intensity value that occurs most often in a particular histogram (and hence in an analyte intensity image). In some embodiments, the pixel intensity variance value represents a value of how spread apart certain pixel intensities are in a histogram (and hence in an analyte intensity image).

FIG. 5A provides an overview of the steps needed to calculate the M/V Ratio. First, the analyte intensity images to be measured are selected, step (510), and histograms for each analyte intensity image are derived, step (520). Next, the mean value and variance of pixel intensity are measured from each derived image intensity histogram, step (530). A ratio of the mean value and variance of pixel intensity is then computed, step (540), to provide the M/V Ratio metric.

Figures 6A, 6B:
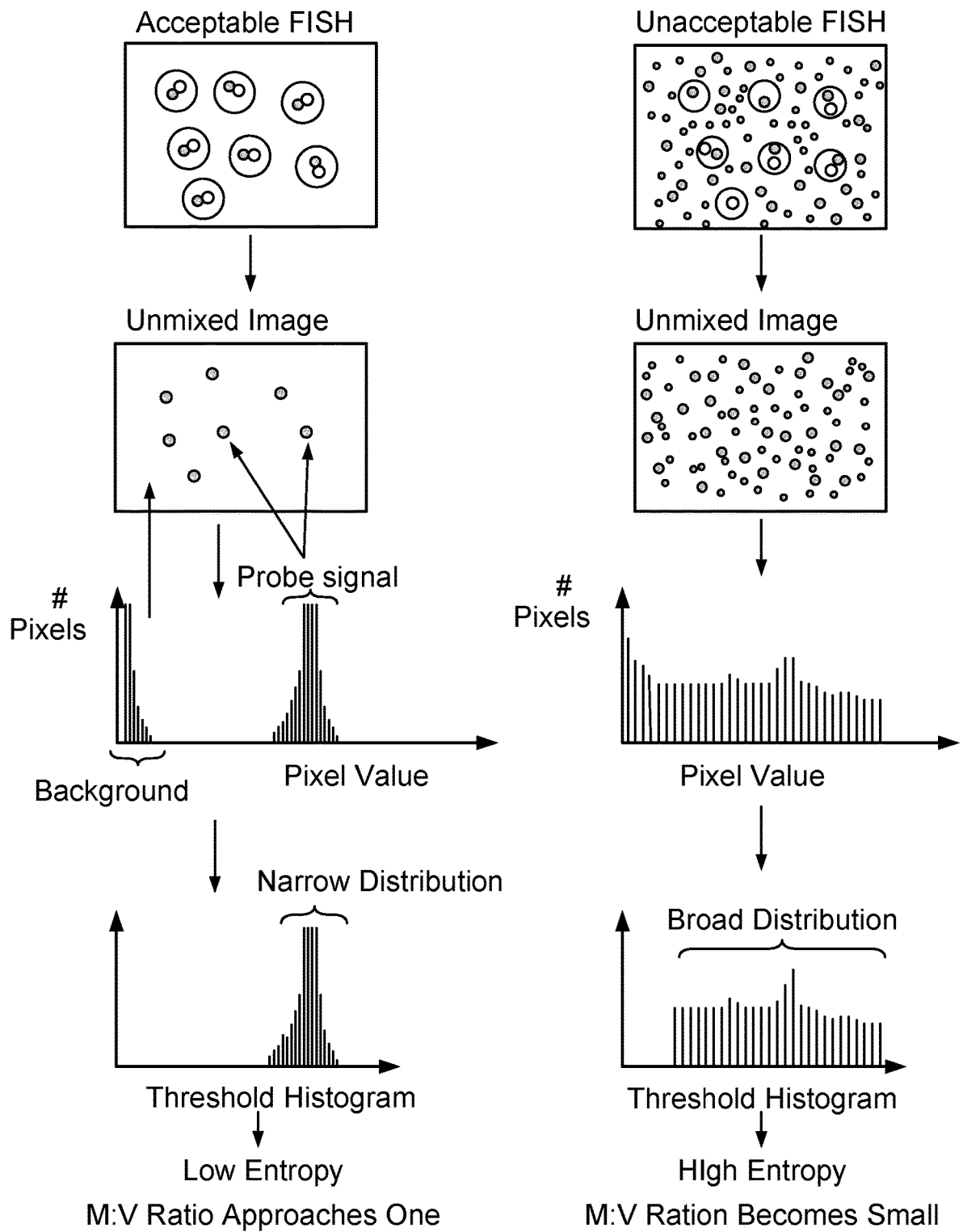
FIG. 6A illustrates histograms of slides having acceptable and unacceptable stain quality.
FIG. 6B illustrates histograms of slides having acceptable and unacceptable stain quality.

In the case of uniform staining, the mean intensity and variance of the intensity across an image will be constant from slide to slide (e.g., for a quantum dot analyte with a given quantum yield). This is due to the relationship between measured signal intensity and the uncertainty of measured light intensity following predictable Poisson distribution (i.e., discrete probability distribution that expresses the probability of a given number of events occurring in a fixed interval of time if these events occur with a known average rate and independently of the time since the last event). For example, when the contribution to variability of signal intensity due to non-specific deposition of a fluorophore is low, the signal localizations are expected to be of uniform intensity (see FIG. 6A). The variance of signal distribution will, in this case, be proportional to the square root of the mean signal magnitude of the relative pixel values (representing stains) in the unmixed image. The variance of the signal will then have a ratio to the mean signal level that is a constant value when other factors are not contributing to higher variability or lower variability of the signal. For example, a few large aggregates of quantum dot interspersed with true signal may extend the tail of the distribution that significantly decreases variance in proportion to the mean signal. As another example, the region of a slide with quantum dot reagent that is sticking non-specifically to the surface may increase (or decrease) the overall variance measured compared to clean, uniformly bright signal localizations (see FIG. 6B). Therefore, the metric provides means of discriminating slides with non-specific reagent sticking (FIG. 6B) from those with low background (FIG. 6A).

For image measurement, a sensor selected and confirmed to have a linear response to increasing illumination is used. The sensor chosen must be of sufficiently high quality that the noise contribution (uncertainty of measurement) is small in proportion to the dynamic range of the intensities of interest in the sample. When these conditions are met, the major contributor to uncertainty in measurement of a uniform intensity is the quantum uncertainty of measuring photons. This source of uncertainty is referred to as "Shot Noise," and the sensor of sufficiently high quality can be referred to as "Shot Noise Limited." ("Shot Noise" is a type of electronic noise which can be modeled by a Poisson process. Shot noise occurs in photon counting in optical devices, where shot noise is associated with the particle nature of light). Examples of sensors include an Interline CCD such as a Sony ICX 285 sensor. Alternatively, and in place of a CCD sensor, image measurement may be performed by incorporating laser scanning and photomultiplier tubes as known in the art.

Using a light-sensitive sensor under standardized conditions the contributions of noise not due to quantum uncertainty is expected to be relatively constant. Therefore, changes in the distribution of pixel values measured under stable conditions may be attributed to the sample when the requirement of standard imaging conditions is met.

Without wishing to be bound by any particular theory, the quantum uncertainty associated with measuring intensity values follows a predictable Poisson distribution. This means that the dispersion of values that will be recorded for a constant light level will be proportional to the square root of the mode intensity value recorded for a sizable number of measurements (numerous pixels in a CCD array or multiple intensity values recorded over time from a photomultiplier tube). It follows that a measure of dispersion, squared, should yield a value that is proportional to the mode intensity for values within a range of interest. This proportional relationship of the intensity to the dispersion of measured is expected to be constant when the variability of the signal is limited by the shot noise. For practical purposes, the mean intensity value is sometimes used in lieu of the mode, particularly for images in which the majority of pixels do not have signal. In some embodiments, if the thresholding is such that the irrelevant pixels in an image are not disregarded (dark areas are not thresholded out of the histogram), then the majority of pixels (mode) may in fact be an irreverent value (0 or black). In this case, the mean value may more closely approximate the value of the relevant pixels (stained signals), which are a small percentage of the overall image in the case of ISH and FISH.

The ratio of a measured pixel intensity mode value and a measured pixel intensity variance value is expected to be constant for a given analyte imaged under standard conditions, and this can be used to determine whether additional factors are influencing the dispersion of intensity values throughout a measured range. If the dispersion of pixel intensity values is larger or smaller than expected from shot noise with a uniform signal then this may indicate that the quality of staining uniformity is outside of specification.

Example 2 provides sample pseudo-code for calculating the MN Ratio. The skilled artisan will recognize, however, that any code may be substituted provided the resulting calculation provides the necessary M/V Ratio values for output to the evaluation module (230) such that stain quality may be assessed or that cutoff values may be derived and serve as objective criteria for staining performance.

In other embodiments, and as an alternative to the M/V Ratio metric, a ratio of a measured mean and a measured standard deviation may be computed from the image histograms derived from the analyte intensity images. For example, it is expected that the standard deviation will scale proportionally to the square root of the mean where the intensity of the staining is uniform. Here, the variance (standard deviation squared) will approximately equal the mean where the staining is uniform and sensor noise is low. Where there is greater variability in the intensity values of pixels in the image, the ratio obtained from this measurement will depart from the characteristic ratio of ideal uniformity.

Evaluation Module

The metrics computed from the metric computation module (220) may be used by the evaluation module (230) such that (i) objective criteria for staining quality or performance may be determined, e.g., cutoff values; (ii) a slide having an unknown stain quality can be evaluated to determine whether it meets pre-determined objective criteria of stain quality; and (iii) to qualify staining inconsistencies (root cause analysis).

Establishment of Criteria for Staining Performance

Figure 7:
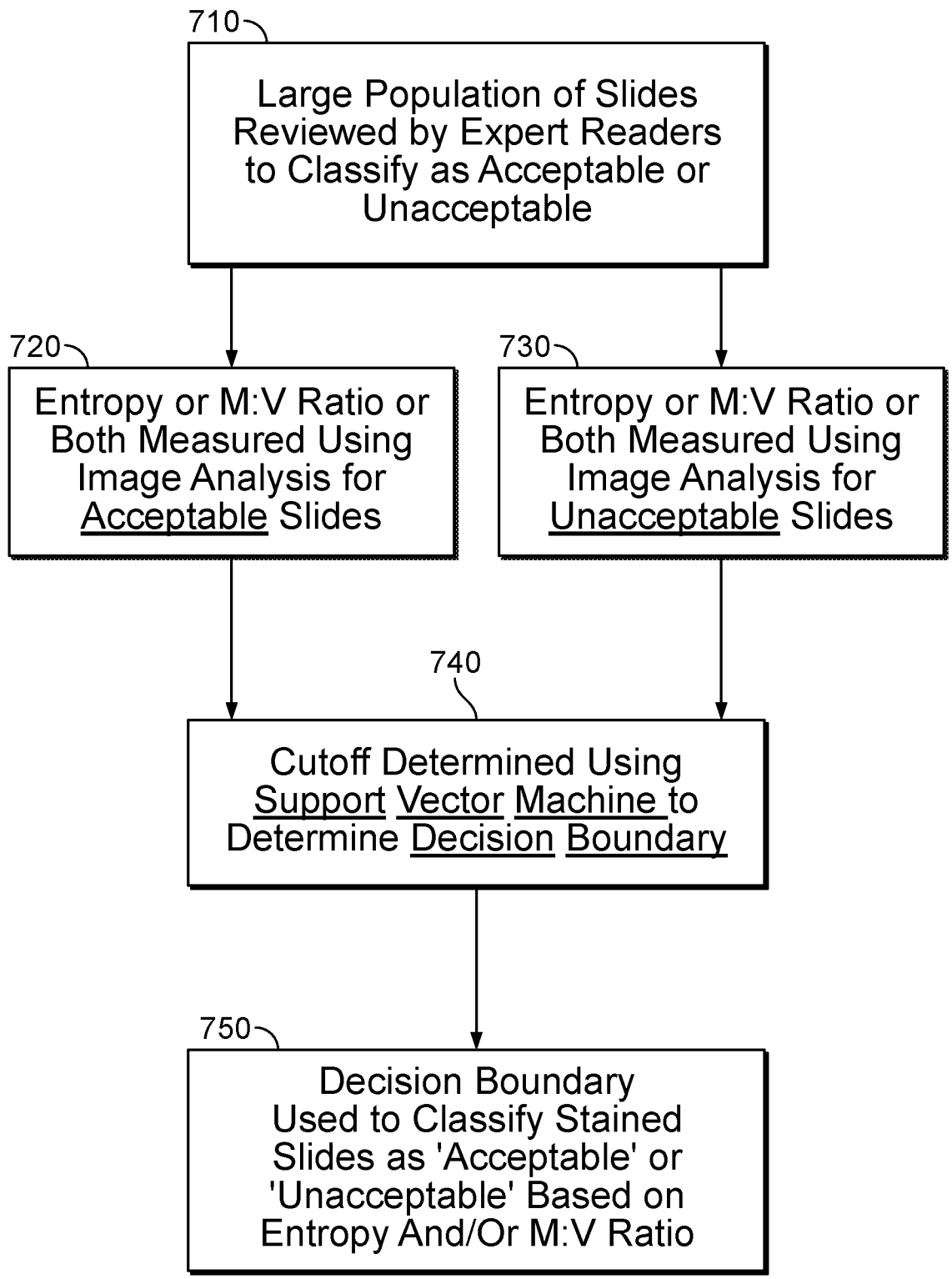
FIG. 7 provides a flowchart demonstrating the steps of determining cutoff values.

With reference to FIG. 7, the development of objective criteria (e.g. cutoff values) may be empirically determined by comparing and evaluating reference slides that are known to be acceptable as determined by an expert pathologist, steps (710), to those that are known to be unacceptable as determined by an expert pathologist, steps (710), wherein the same analytes are being detected in both the acceptable and unacceptable quality slides. To achieve this, metrics (e.g., entropy and M/V ratio) are computed for both sets of reference slides, steps (720) and (730), and the metrics for all reference slides are analyzed to derive cutoff values or a decision boundary, using one of a support vector machine, a linear discriminant analysis, or a logistic regression analysis, steps (740). For example, by plotting computed entropy values and M/V ratio values for slides deemed by expert pathologists as acceptable or unacceptable (see FIG. 8), with each point on the graph representing an entropy and M/V value from each reference slide (e.g., vectors representing multivariate data points), a decision boundary may be determined. The cutoff values (e.g., a hyperplane from the SVM) or decision boundary are then used as objective criteria for stain assessment of slides whose stain quality is unknown (750).

Linear discriminant analysis and logistic regression analysis are statistical methods known to those of ordinary skill in the art. For example, logistic regression may be used to classify the probability of an unknown slide as acceptable or unacceptable, where the cutoff is then a probability (e.g., p=0.005).

A support vector machine is a classification technique, which is based on statistical learning theory where a nonlinear input data set is converted into a high dimensional linear feature space via kernels for the non-linear case. In general, support vector machines project a set of training data, E, that represents two different classes into a high-dimensional space by means of a kernel function, K. In this transformed data space, nonlinear data are transformed so that a flat line can be generated (a discriminating hyperplane) to separate the classes so as to maximize the class separation. Testing data are then projected into the high-dimensional space via K, and the test data are classified on the basis of where they fall with respect to the hyperplane. The kernel function K defines the method in which data are projected into the high-dimensional space.

Determination of the objective criteria allows for slides to be classified as "acceptable" or "unacceptable" based on computed metrics rather than subjective criteria. The cutoff values or decision boundary established as objective criteria allows for the determination of acceptable or unacceptable (i) stain uniformity, (ii) anomalous background staining, (iii) speckling, (iv) intensity, and/or (v) other performance criteria without reliance on subjective standards. Indeed, the establishment of objective criteria allows for repeatability in testing and also allows for even small changes in staining performance to be detected and classified, such as those changes resulting from the use of different reagents (e.g. reagents supplied from various venders), instruments, or technique (see root cause analysis below and FIG. 9). Examples 3 and 4 herein describe methods of collecting image data from acceptable and unacceptable reference slides, as determined by expert pathologists, unmixing the data from the images to yield unmixed analyte intensity images, and computing entropy and M/V ratio metrics for those unmixed analyte intensity images. Example 5 then demonstrates the development of objective criteria, i.e. cutoff values, based on the computed metrics.

Stain Quality Assessment Based on Pre-Determined Cutoff Values

In some embodiments, established cutoff values for a particular detectable analyte, tissue specimen, or assay are used to determine whether a slide of unknown stain quality meets pre-determined objective criteria for stain quality. For example, metrics (e.g., entropy, M/V Ratio) may be computed for such a slide to determine whether the slide is acceptable or unacceptable by objectively comparing the computed metrics to predetermined cutoff values. If the computed metrics meet or exceed the cutoff values, within any degree of error margin, the slides may be retained for further downstream processing. If the computed metrics do not meet the established cutoff values, the slide may be rejected for further downstream processing (or, for example, the slide may still be processed, but a notation made that the slide has unacceptable stain quality and that any data derived from the slide could be erroneous). The cutoff values may be stored in a database that is accessible by the computer device or system. Cutoff values may be specific to a particular tissue type and assay; therefore, a library of acceptable staining cutoff criteria may be maintained in a computer used for slide classification. For development of a given staining protocol and assay, the proportion of slides falling into the acceptable range is compared to the proportion of slides falling into the unacceptable range with each adjustment of the staining conditions. This process will permit determination of staining conditions that are most likely to yield slides staining in the acceptable range.

In some embodiments, the established or predetermined cutoff values are entropy cutoff values. In other embodiments, the established or predetermined cutoff values are mean-variance ratio cutoff values. In yet other embodiments, the established or predetermined cutoff values are a value that is some numerical combination of entropy cutoff values or mean-variance ratio cutoff values.

Qualification of Staining Inconsistencies (Root Cause Analysis)

Slides having a stain quality not meeting cutoff values may be further evaluated to determine a root cause for the stain quality deficiency or inconsistency. By further analyzing one or more of the computed metrics, the stain quality deficiency or inconsistency may be qualified (e.g., being attributable to instrumentation issues/differences, reagent issues/differences, preparation inconsistencies, etc.). The stain quality qualification may be output to a user such that the slide may be treated to correct any staining or labeling defects or that instrument processing parameters may be adjusted to provide slides meeting requisite performance criteria. In some embodiments, the device and/or method of the claimed disclosure may be tied to a staining apparatus such that staining may be monitored in real-time or that tests may be run prior to any batch processing of tissue samples. Running control slides with tissue or xenograft sections with known staining properties on automated staining instrumentation provides a reference sample that can be compared to the expected staining outcome for such standardized samples. In cases where the staining quality measurement differs from the expected outcome, the instrument may be determined to be in working order before valuable clinical samples are run on an instrument. There may exist a known correlation between particular deviations in the staining metrics and instrument failure mechanisms, for instance, poor washing may result in high non-specific background and high entropy measurements. This information may be used in the diagnosis of instrument failure and subsequent repair of the instrument.

Figure 9A:
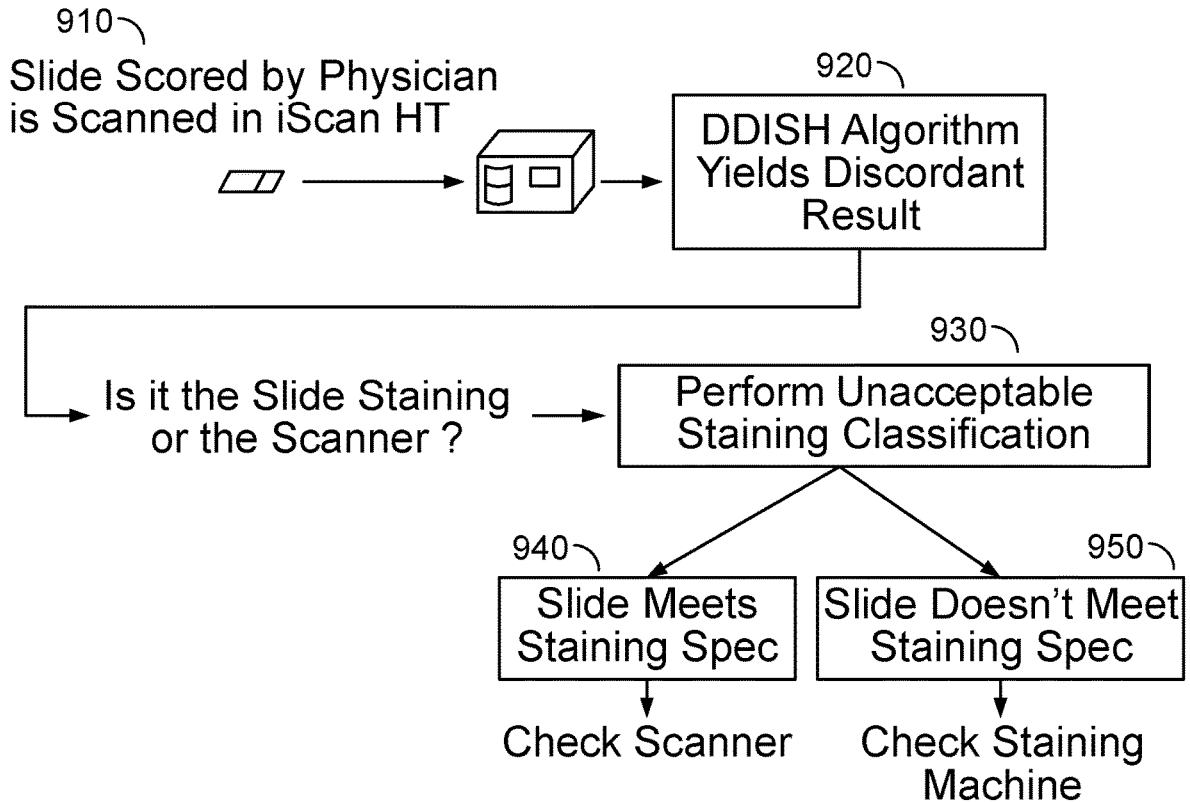
FIG. 9A provides a flowchart demonstrating the steps of determining a root cause of staining inconsistencies.

As an example, and with reference to FIG. 9A, scored slides are scanned, step (910), and an evaluation is made as to whether the result is inconsistent, step (920). To determine whether an inconsistent result is caused by a slide staining apparatus or the scanner, the slide is classified on a separate imaging instrument, step (930) and if the slide meets the staining specification, step (940), the scanner should be checked for inconsistencies. On the other hand, if the slide does not meet the staining specification, step (950), a staining apparatus should be checked for inconsistencies. When slide staining is determined to be within specification, the artifacts that lead to an inconsistent result may be attributed to the imaging process. Aspects of the imaging process that impact slide evaluation may involve poor focus on the specimen, dirty optics, malfunction of the camera electronics, malfunction of the illumination apparatus, and problems with the specimen positioning mechanism. To narrow the cause of imaging issues, inspection and/or measurement of the anomalous scanned image may reveal characteristic artifacts that are diagnostic of the imaging equipment. One example of an image measurement would be unusually low values for a derivative image implying that the edges of structures are out of focus.

Figure 9B:
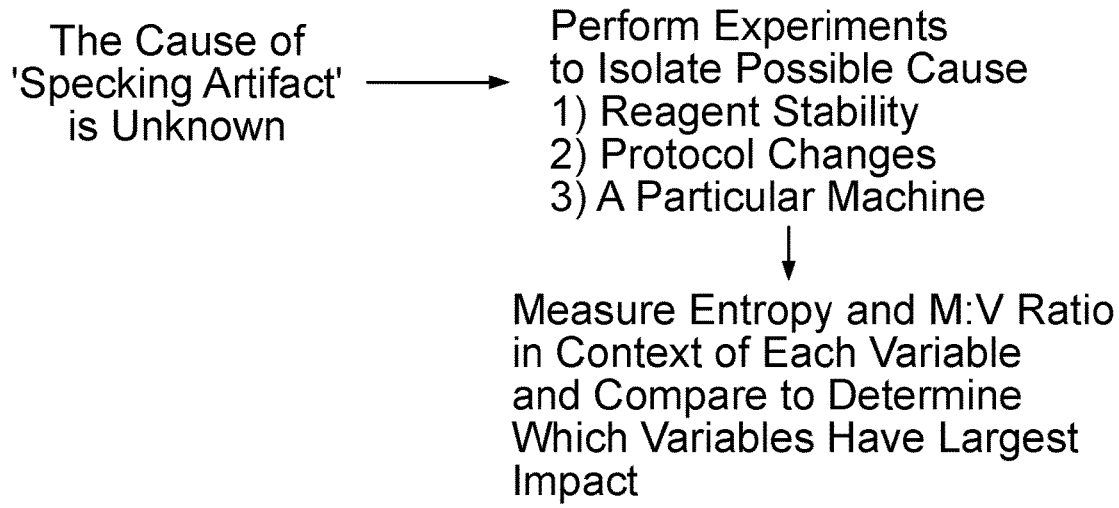
FIG. 9B provides a flowchart demonstrating the steps of determining a root cause of staining inconsistencies.

As another example, to find the root cause of a speckling artifact, experiments may be performed to isolate possible causes (e.g., reagent stability, protocol changes, or a particular machine or instrument), see FIG. 9B. For example, metrics such as entropy and M/V Ratio may be measured in the context of each variable and compared to determine whether any of the individual variables have a large impact on the observed artifacts. When all of the conditions of slide staining are held constant except for one variable, such as washing stringency, the impact of this variable may be measured using the multiple metrics, such as entropy and M/V Ratio. A deviation in this variable may have an impact that is biased toward one metric over the other, for instance, the M/V Ratio may show a larger deviation than entropy or vice versa. Some staining perturbations may result in characteristic higher (or lower) values for each metric. By assembling reference datasets determined from many slides imaged under known anomalous conditions, patterns emerge that enable clustering of slides from unknown staining conditions with groups of measurements correlated to the most likely root cause.

Examples of Analytes and Components for Labeling Targets

In some embodiments, the stain or analyte being detected comprises one or more quantum dots, fluorophores, enzyme-deposited fluorophores or chromogenic stains, or any combination thereof. While some embodiments disclosed herein, including Examples 3, 4, and 5, may refer to tissue samples labeled with one or more quantum dots, the disclosure is not limited to the use of quantum dots. Exemplary labels include radioactive isotopes, fluorophores, quantum dots, chromophores, chromogenic brightfield agents, ligands, chemiluminescent agents, enzyme deposited fluorophores, haptens, and combinations thereof. Indeed, a wide variety of fluorophores and chromogenic stains are available for labeling in situ hybridization probes, with emission (or absorption) extending from the ultraviolet end of the spectrum to the near infrared, as described further below. In general, the most frequently used fluorophores belong to several common chemical classes including coumarins, fluoresceins, rhodamines, and cyanines. Silver stains and fast red stains are examples of enzymatically deposited chromogenic or light absorbing stains that may be used by the skilled artisan. Methods for labeling and guidance in the choice of labels appropriate for various purposes are discussed, for example, in Sambrook et al., Molecular Cloning: A Laboratory Manual, Cold Spring Harbor Laboratory Press (1989) and Ausubel et al., Current Protocols in Molecular Biology, Greene Publishing Associates and Wiley-Intersciences (1987), the disclosures of which are incorporated herein by reference. Of course, the skilled artisan will be able to adapt the methods employed herein to accommodate these and other agents such that stain quality and/or uniformity assessments may be made.

A detectable label can be detected directly or indirectly, and several different detectable labels conjugated to different specific-binding molecules can be used in combination to detect one or more targets. For example, a first detectable label such as a hapten conjugated to an antibody specific to a target can be detected indirectly through the use of a second detectable label that is conjugated to a molecule that specifically binds the first detectable label. Multiple detectable labels that can be separately detected can be conjugated to different specific binding molecules that specifically bind different targets to provide a multiplexed assay that can provide simultaneous detection of the multiple targets in a sample. A detectable signal can be generated by any known or yet to be discovered mechanism including absorption, emission and/or scattering of a photon (including radio frequency, microwave frequency, infrared frequency, visible frequency and ultra-violet frequency photons). As described above, detectable labels or analytes include colored, fluorescent, phosphorescent and luminescent molecules and materials, catalysts (such as enzymes) that convert one substance into another substance to provide a detectable difference (such as by converting a colorless substance into a colored substance or vice versa, or by producing a precipitate or increasing sample turbidity), haptens that can be detected through antibody-hapten binding interactions using additional detectably labeled antibody conjugates, and paramagnetic and magnetic molecules or materials. Particular examples of detectable labels include enzymes such as horseradish peroxidase, alkaline phosphatase, acid phosphatase, glucose oxidase, β-galactosidase or β-glucuronidase; fluorophores such as fluoresceins, luminophores, coumarins, BODIPY dyes, resorufins, and rhodamines (many additional examples of fluorescent molecules can be found in *The Handbook—A Guide to Fluorescent Probes and Labeling Technologies*, Molecular Probes, Eugene, Oreg.); nanoparticles such as quantum dots (described further below); metal chelates such as DOTA and DPTA chelates of radioactive or paramagnetic metal ions like $Gd^{3+}$; and liposomes, for example, liposomes containing trapped fluorescent molecules. Where the detectable label includes an enzyme, a detectable substrate such as a chromogen, a fluorogenic compound, or a luminogenic compound can be used in combination with the enzyme to generate a detectable signal (a wide variety of such compounds are commercially available, for example, from Invitrogen Corporation, Eugene Oreg.). Particular examples of chromogenic compounds include diaminobenzidine (DAB), 4-nitrophenylphospate (pNPP), fast red, bromochloroindolyl phosphate (BCIP), nitro blue tetrazolium (NBT), BCIP/NBT, fast red, AP Orange, AP blue, tetramethylbenzidine (TMB), 2,2'-azino-di-[3-ethylbenzothiazoline sulphonate] (ABTS), o-dianisidine, 4-chloronaphthol (4-CN), nitrophenyl-β-D-galactopyranoside (ONPG), o-phenylenediamine (OPD), 5-bromo-4-chloro-3-indolyl-β-galactopyranoside (X-Gal), methylumbelliferyl-β-D-galactopyranoside (MU-Gal), p-nitrophenyl-α-D-galactopyranoside (PNP), 5-bromo-4-chloro-3-indolyl-β-D-glucuronide (X-Gluc), 3-amino-9-ethyl carbazol (AEC), fuchsin, iodonitrotetrazolium (INT), tetrazolium blue and tetrazolium violet. Alternatively, an enzyme can be used in a metallographic detection scheme. Metallographic detection methods include using an enzyme such as alkaline phosphatase in combination with a water-soluble metal ion and a redox-inactive substrate of the enzyme. In some embodiments, the substrate is converted to a redox-active agent by the enzyme, and the redox-active agent reduces the metal ion, causing it to form a detectable precipitate. See, for example, U.S. patent application Ser. No. 11/015,646, filed Dec. 20, 2004, PCT Publication No. 2005/003777 and U.S. Patent Application Publication No. 2004/0265922; each of which is incorporated by reference herein. Metallographic detection methods include using an oxido-reductase enzyme (such as horseradish peroxidase) along with a water soluble metal ion, an oxidizing agent and a reducing agent, again to for form a detectable precipitate. See, for example, U.S. Pat. No. 6,670,113, which is incorporated by reference herein. Haptens are small molecules that are specifically bound by antibodies, although by themselves they will not elicit an immune response in an animal and must first be attached to a larger carrier molecule such as a protein to generate an immune response. Examples of haptens include di-nitrophenyl, biotin, digoxigenin, and fluorescein. Additional examples of oxazole, pyrazole, thiazole, nitroaryl, benzofuran, triperpene, urea, thiourea, rotenoid, coumarin and cycolignan haptens are disclosed in U.S. Provisional Patent Application No. 60/856,133, filed Nov. 1, 2006, which is incorporated by reference herein.

Nanocrystalline quantum dots are semiconductor nanocrystalline particles and typically range from about 2-10 nm in size. Quantum dots are stable fluorophores, often are resistant to photo bleaching, and have a wide range of excitation wavelengths with a narrow emission spectrum. As used herein, the term "quantum dot" should be read broadly to cover luminescent semi-conductor nanocrystals generally, including CdSe nanoparticles as well as CdTe or other luminescent semi-conductor nanoparticles. Such particles may take any geometric form, including spherical, rod, wires, or other. Gold particles may also be used.

Quantum dots have, for example, been constructed of semiconductor materials (e.g., cadmium selenide and lead sulfide) and from crystallites (grown via molecular beam epitaxy), etc. A variety of quantum dots having various surface chemistries and fluorescence characteristics are commercially available from Invitrogen Corporation, Eugene, Oreg., or Invitrogen Nanocrystal Technologies, Hayward, Calif. (see, for example, U.S. Pat. Nos. 6,815,064, 6,682,596 and 6,649,138, each of which patents is incorporated by reference herein). Quantum dots are also commercially available from Evident Technologies (Troy, N.Y.). Other quantum dots include alloy quantum dots such as ZnSSe, ZnSeTe, ZnSTe, CdSSe, CdSeTe, ScSTe, HgSSe, HgSeTe, HgSTe, ZnCdS, ZnCdSe, ZnCdTe, ZnHgS, ZnHgSe, ZnHgTe, CdHgS, CdHgSe, CdHgTe, ZnCdSSe, ZnHgSSe, ZnCdSeTe, ZnHgSeTe, CdHgSSe, CdHgSeTe, InGaAs, GaAlAs, and InGaN quantum dots.

Yet other commercially available quantum dots include those provided under brand name Qdot™ from Life Technologies, Inc. Exemplary working embodiments utilize quantum dots, such as Qdot™ 565 and Qdot™ 655 nanocrystals, where the number used in such nomenclature refers to the approximate wavelength of the nanoparticle's emission maximum. For example, a Qdot™ 565 nanocrystal emits light having a wavelength of 565 nm and produces a light-green color. Thus, quantum dots can be selected to provide a detectable signal at a particular wavelength. Detection is performed through a variety of means, for example a fluorescent microscope, fluorometer, fluorescent scanner, etc., depending on a given application.

Quantum dots having particular emission characteristics, such as emissions at particular wavelengths, can be selected such that plural different quantum dots having plural different emission characteristics can be used to identify plural different targets. Quantum dot bioconjugates are characterized by quantum yields comparable to the brightest traditional fluorescent dyes available. Additionally, these quantum dot-based fluorophores absorb about 10-1000 times more light than traditional fluorescent dyes. Emission from the quantum dots is narrow and symmetric, which means that overlap with other colors is minimized, resulting in minimal bleed-through into adjacent detection channels and attenuated crosstalk, which can lead to the simultaneous multiplexing of differentially emitting quantum dots for detection purposes. Symmetrical and tunable emission spectra can be varied according to the size and material composition of the particles, which allows flexible and close spacing of different quantum dots without substantial spectral overlap. In addition, their absorption spectra are broad, which makes it possible to excite all quantum dot color variants simultaneously using a single excitation wavelength, thereby minimizing sample autofluorescence.

Other Components for Practicing Embodiments of the Present Disclosure

The computer system of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

The specimen processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners (hereinafter collectively referred to as "stains"). The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. The imaging apparatus may be a brightfield imager slide scanner, a microscope associated with or including a scanner or spectral camera, or any source that can capture image content at a range of frequencies, enabling hyperspectral or fluorescence imaging. One brightfield imager is the iScan Coreo™ brightfield scanner sold by Ventana Medical Systems, Inc. In automated embodiments, the imaging apparatus is a digital pathology device as disclosed in International Patent Application No. PCT/US2010/002772 (Patent Publication No. WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME. International Patent Application No. PCT/US2010/002772 and U.S. Patent Application No. 61/533,114 are incorporated by reference in their entities. In other embodiments, the imaging apparatus includes a digital camera coupled to a microscope.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s).

As described above, the modules include logic that is executed by processor 105. "Logic," as used herein and throughout this disclosure, refers to any information having the form of instruction signals and/or data that may be applied to affect the operation of a processor. Software is one example of such logic. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). For example, the network 109 of FIG. 1A can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Samples and Targets

Samples include biological components and generally are suspected of including one or more target molecules of interest. Target molecules can be on the surface of cells and the cells can be in a suspension, or in a tissue section. Target molecules can also be intracellular and detected upon cell lysis or penetration of the cell by a probe. One of ordinary skill in the art will appreciate that the method of detecting target molecules in a sample will vary depending upon the type of sample and probe being used. Methods of collecting and preparing samples are known in the art.

Samples for use in the embodiments of the method and with the composition disclosed herein, such as a tissue or other biological sample, can be prepared using any method known in the art by of one of ordinary skill. The samples can be obtained from a subject for routine screening or from a subject that is suspected of having a disorder, such as a genetic abnormality, infection, or a neoplasia. The described embodiments of the disclosed method can also be applied to samples that do not have genetic abnormalities, diseases, disorders, etc., referred to as "normal" samples. Such normal samples are useful, among other things, as controls for comparison to other samples. The samples can be analyzed for many different purposes. For example, the samples can be used in a scientific study or for the diagnosis of a suspected malady, or as prognostic indicators for treatment success, survival, etc.

Samples can include multiple targets that can be specifically bound by a probe or reporter molecule. The targets can be nucleic acid sequences or proteins. Throughout this disclosure when reference is made to a target protein it is understood that the nucleic acid sequences associated with that protein can also be used as a target. In some examples, the target is a protein or nucleic acid molecule from a pathogen, such as a virus, bacteria, or intracellular parasite, such as from a viral genome. For example, a target protein may be produced from a target nucleic acid sequence associated with (e.g., correlated with, causally implicated in, etc.) a disease.

A target nucleic acid sequence can vary substantially in size. Without limitation, the nucleic acid sequence can have a variable number of nucleic acid residues. For example, a target nucleic acid sequence can have at least about 10 nucleic acid residues, or at least about 20, 30, 50, 100, 150, 500, 1000 residues. Similarly, a target polypeptide can vary substantially in size. Without limitation, the target polypeptide will include at least one epitope that binds to a peptide specific antibody, or fragment thereof. In some embodiments that polypeptide can include at least two epitopes that bind to a peptide specific antibody, or fragment thereof.

In specific, non-limiting examples, a target protein is produced by a target nucleic acid sequence (e.g., genomic target nucleic acid sequence) associated with a neoplasm (for example, a cancer). Numerous chromosome abnormalities (including translocations and other rearrangements, amplification or deletion) have been identified in neoplastic cells, especially in cancer cells, such as B cell and T cell leukemias, lymphomas, breast cancer, colon cancer, neurological cancers and the like. Therefore, in some examples, at least a portion of the target molecule is produced by a nucleic acid sequence (e.g., genomic target nucleic acid sequence) amplified or deleted in at least a subset of cells in a sample.

Oncogenes are known to be responsible for several human malignancies. For example, chromosomal rearrangements involving the SYT gene located in the breakpoint region of chromosome 18q11.2 are common among synovial sarcoma soft tissue tumors. The t(18q11.2) translocation can be identified, for example, using probes with different labels: the first probe includes FPC nucleic acid molecules generated from a target nucleic acid sequence that extends distally from the SYT gene, and the second probe includes FPC nucleic acid generated from a target nucleic acid sequence that extends 3' or proximal to the SYT gene. When probes corresponding to these target nucleic acid sequences (e.g., genomic target nucleic acid sequences) are used in an in situ hybridization procedure, normal cells, which lack a t(18q11.2) in the SYT gene region, exhibit two fusion (generated by the two labels in close proximity) signals, reflecting the two intact copies of SYT. Abnormal cells with a t(18q11.2) exhibit a single fusion signal.

In other examples, a target protein produced from a nucleic acid sequence (e.g., genomic target nucleic acid sequence) is selected that is a tumor suppressor gene that is deleted (lost) in malignant cells. For example, the p16 region (including D9S1749, D9S1747, p16(INK4A), p14(ARF), D9S1748, p15(INK4B), and D9S1752) located on chromosome 9p21 is deleted in certain bladder cancers. Chromosomal deletions involving the distal region of the short arm of chromosome 1 (that encompasses, for example, SHGC57243, TP73, EGFL3, ABL2, ANGPTL1, and SHGC-1322), and the pericentromeric region (e.g., 19p13-19q13) of chromosome 19 (that encompasses, for example, MAN2B1, ZNF443, ZNF44, CRX, GLTSCR2, and GLTSCR1) are characteristic molecular features of certain types of solid tumors of the central nervous system.

The aforementioned examples are provided solely for purpose of illustration and are not intended to be limiting.

Numerous other cytogenetic abnormalities that correlate with neoplastic transformation and/or growth are known to those of ordinary skill in the art. Target proteins that are produced by nucleic acid sequences (e.g., genomic target nucleic acid sequences), which have been correlated with neoplastic transformation and which are useful in the disclosed methods, also include the EGFR gene (7p12; e.g., GENBANK™ Accession No. NC-000007, nucleotides 55054219-55242525), the C-MYC gene (8q24.21; e.g., GENBANK™ Accession No. NC-000008, nucleotides 128817498-128822856), D5S271 (5p15.2), lipoprotein lipase (LPL) gene (8p22; e.g., GENBANK™ Accession No. NC-000008, nucleotides 19841058-19869049), RB1 (13q14; e.g., GENBANK™ Accession No. NC-000013, nucleotides 47775912-47954023), p53 (17p13.1; e.g., GENBANK™ Accession No. NC-000017, complement, nucleotides 7512464-7531642)), N-MYC (2p24; e.g., GENBANK™ Accession No. NC-000002, complement, nucleotides 151835231-151854620), CHOP (12q13; e.g., GENBANK™ Accession No. NC-000012, complement, nucleotides 56196638-56200567), FUS (16p11.2; e.g., GENBANK™ Accession No. NC-000016, nucleotides 31098954-31110601), FKHR (13p14; e.g., GENBANK™ Accession No. NC-000013, complement, nucleotides 40027817-40138734), as well as, for example: ALK (2p23; e.g., GENBANK™ Accession No. NC-000002, complement, nucleotides 29269144-29997936), Ig heavy chain, CCND1 (11q13; e.g., GENBANK™ Accession No. NC-000011, nucleotides 69165054.69178423), BCL2 (18q21.3; e.g., GENBANK™ Accession No. NC-000018, complement, nucleotides 58941559-59137593), BCL6 (3q27; e.g., GENBANK™ Accession No. NC-000003, complement, nucleotides 188921859-188946169), MALF1, AP1 (1p32-p31; e.g., GENBANK™ Accession No. NC-000001, complement, nucleotides 59019051-59022373), TOP2A (17q21-q22; e.g., GENBANK™ Accession No. NC-000017, complement, nucleotides 35798321-35827695), TMPRSS (21q22.3; e.g., GENBANK™ Accession No. NC-000021, complement, nucleotides 41758351-41801948), ERG (21q22.3; e.g., GENBANK™ Accession No. NC-000021, complement, nucleotides 38675671-38955488); ETV1 (7p21.3; e.g., GENBANK™ Accession No. NC-000007, complement, nucleotides 13897379-13995289), EWS (22q12.2; e.g., GENBANK™ Accession No. NC-000022, nucleotides 27994271-28026505); FLI1 (11q24.1-q24.3; e.g., GENBANK™ Accession No. NC-000011, nucleotides 128069199-128187521), PAX3 (2q35-q37; e.g., GENBANK™ Accession No. NC-000002, complement, nucleotides 222772851-222871944), PAX7 (1p36.2-p36.12; e.g., GENBANK™ Accession No. NC-000001, nucleotides 18830087-18935219), PTEN (10q23.3; e.g., GENBANK™ Accession No. NC-000010, nucleotides 89613175-89716382), AKT2 (19q13.1-q13.2; e.g., GENBANK™ Accession No. NC-000019, complement, nucleotides 45431556-45483036), MYCL1 (1p34.2; e.g., GENBANK™ Accession No. NC-000001, complement, nucleotides 40133685-40140274), REL (2p13-p12; e.g., GENBANK™ Accession No. NC-000002, nucleotides 60962256-61003682) and CSF1R (5q33-q35; e.g., GENBANK™ Accession No. NC-000005, complement, nucleotides 149413051-149473128).

In other examples, a target protein is selected from a virus or other microorganism associated with a disease or condition. Detection of the virus- or microorganism-derived target nucleic acid sequence (e.g., genomic target nucleic acid sequence) in a cell or tissue sample is indicative of the presence of the organism. For example, the target peptide, polypeptide or protein can be selected from the genome of an oncogenic or pathogenic virus, a bacterium or an intracellular parasite (such as *Plasmodium falciparum* and other *Plasmodium* species, *Leishmania* (sp.), *Cryptosporidium parvum, Entamoeba histolytica*, and *Giardia lamblia*, as well as *Toxoplasma, Eimeria, Theileria*, and *Babesia* species).

In some examples, the target protein is produced from a nucleic acid sequence (e.g., genomic target nucleic acid sequence) from a viral genome. Exemplary viruses and corresponding genomic sequences (GENBANK™ RefSeq Accession No. in parentheses) include human adenovirus A (NC-001460), human adenovirus B (NC-004001), human adenovirus C(NC-001405), human adenovirus D (NC-002067), human adenovirus E (NC-003266), human adenovirus F (NC-001454), human astrovirus (NC-001943), human BK polyomavirus (V01109; GI:60851) human bocavirus (NC-007455), human coronavirus 229E (NC-002645), human coronavirus HKU1 (NC-006577), human coronavirus NL63 (NC-005831), human coronavirus OC43 (NC-005147), human enterovirus A (NC-001612), human enterovirus B (NC-001472), human enterovirus C(NC-001428), human enterovirus D (NC-001430), human erythrovirus V9 (NC-004295), human foamy virus (NC-001736), human herpesvirus 1 (Herpes simplex virus type 1) (NC-001806), human herpesvirus 2 (Herpes simplex virus type 2) (NC-001798), human herpesvirus 3 (Varicella zoster virus) (NC-001348), human herpesvirus 4 type 1 (Epstein-Barr virus type 1) (NC-007605), human herpesvirus 4 type 2 (Epstein-Barr virus type 2) (NC-009334), human herpesvirus 5 strain AD 169 (NC-001347), human herpesvirus 5 strain Merlin Strain (NC-006273), human herpesvirus 6A (NC-001664), human herpesvirus 6B (NC-000898), human herpesvirus 7 (NC-001716), human herpesvirus 8 type M (NC-003409), human herpesvirus 8 type P (NC-009333), human immunodeficiency virus 1 (NC-001802), human immunodeficiency virus 2 (NC-001722), human metapneumovirus (NC-004148), human papillomavirus-1 (NC-001356), human papillomavirus-18 (NC-001357), human papillomavirus-2 (NC-001352), human papillomavirus-54 (NC-001676), human papillomavirus-61 (NC-001694), human papillomavirus-cand90 (NC-004104), human papillomavirus RTRX7 (NC-004761), human papillomavirus type 10 (NC-001576), human papillomavirus type 101 (NC-008189), human papillomavirus type 103 (NC-008188), human papillomavirus type 107 (NC-009239), human papillomavirus type 16 (NC-001526), human papillomavirus type 24 (NC-001683), human papillomavirus type 26 (NC-001583), human papillomavirus type 32 (NC-001586), human papillomavirus type 34 (NC-001587), human papillomavirus type 4 (NC-001457), human papillomavirus type 41 (NC-001354), human papillomavirus type 48 (NC-001690), human papillomavirus type 49 (NC-001591), human papillomavirus type 5 (NC-001531), human papillomavirus type 50 (NC-001691), human papillomavirus type 53 (NC-001593), human papillomavirus type 60 (NC-001693), human papillomavirus type 63 (NC-001458), human papillomavirus type 6b (NC-001355), human papillomavirus type 7 (NC-001595), human papillomavirus type 71 (NC-002644), human papillomavirus type 9 (NC-001596), human papillomavirus type 92 (NC-004500), human papillomavirus type 96 (NC-005134), human parainfluenza virus 1 (NC-003461), human parainfluenza virus 2 (NC-003443), human parainfluenza virus 3 (NC-001796), human parechovirus (NC-001897), human parvovirus 4 (NC-007018), human parvovirus B19 (NC-000883), human respiratory syncytial virus (NC-001781), human rhinovirus A (NC-001617), human rhinovirus B (NC-001490), human spumaretrovirus (NC-001795), human T-lymphotropic virus 1 (NC-001436), human T-lymphotropic virus 2 (NC-001488).

In certain examples, the target protein is produced from a nucleic acid sequence (e.g., genomic target nucleic acid sequence) from an oncogenic virus, such as Epstein-Barr Virus (EBV) or a Human Papilloma Virus (HPV, e.g., HPV16, HPV18). In other examples, the target protein produced from a nucleic acid sequence (e.g., genomic target nucleic acid sequence) is from a pathogenic virus, such as a Respiratory Syncytial Virus, a Hepatitis Virus (e.g., Hepatitis C Virus), a Coronavirus (e.g., SARS virus), an Adenovirus, a Polyomavirus, a Cytomegalovirus (CMV), or a Herpes Simplex Virus (HSV).

Example 1—Sample Pseudo-Code Describing an Algorithm for Calculating the Image Entropy Function Entropy Calculator (argument=Histogram)
Sum=O
Entropy=O
For each Bin in Histogram: Sum=Sum+Bin Frequency
For each Bin in Histogram: Probability=Bin Frequency Sum
If Probability>0.99/Sum:
Entropy=Entropy+(−1*Probability*(log(Probability)/log(2.0))
Return Entropy Example 2—Sample Pseudo-Code Describing an Algorithm for Calculating the Image Mean/Variance Ratio Pixel Mean: Variance Calculator (argument=List of Pixel Values)
Mean Pixel Value=Mean(List of Pixel Values)
Pixel Value Variance=(Standard Deviation (List of Pixel Values))2
Mean: Variance Ratio=Mean Pixel Value/Pixel Value Variance
Return Mean: Variance Ratio Example 3—Slide Preparation and Imaging DIG=3-[(3S,5R,8R,9S,10S,12R,13S,14S,17R)-3,12,14-trihydroxy-10,13-dimethyl-1,2,3,4,5,6,7,8,9,11,12,15,16,17-tetradecahydrocyclopenta[a]phenanthren-17-yl]-2H-furan-5-one;
DNP=2,4-dinitrophenyl
Four different slides with sections from the same tissue micro-array (TMA) block were evaluated for 5'3' ERG FISH stain quality with quantum dot 565 and quantum dot 655. The quantum dot reporting particles were conjugated to either anti-DNP hapten or anti-DIG hapten such that one wavelength quantum dot (e.g., 655 nm) would be targeted to a DNP labeled FISH probe, and the other quantum dot (e.g. 565 nm) would be targeted to a DIG labeled FISH probe. In this particular example, the level of non-specific binding of quantum dot 655 (labeling the 3' probe) was compared using quantum dot 655 conjugated to anti-DIG monoclonal antibody and quantum dot 655 conjugated to anti-DNP monoclonal antibody. Quantum dot 565 (5' Probe) was conjugated to anti-DIG in the case where 3' ERG was labeled with quantum dot 655 anti-DNP. Quantum dot 565 was conjugated to anti-DNP in the case where quantum dot 655 labels the DIG hapten.

Figure 13:
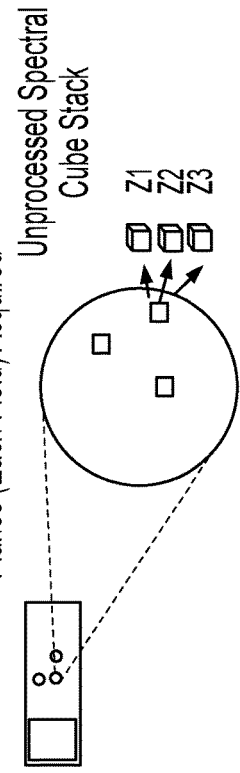
FIG. 13 provides an acquisition strategy for evaluation of FISH stain quality on tissue cores.
Figure 13:
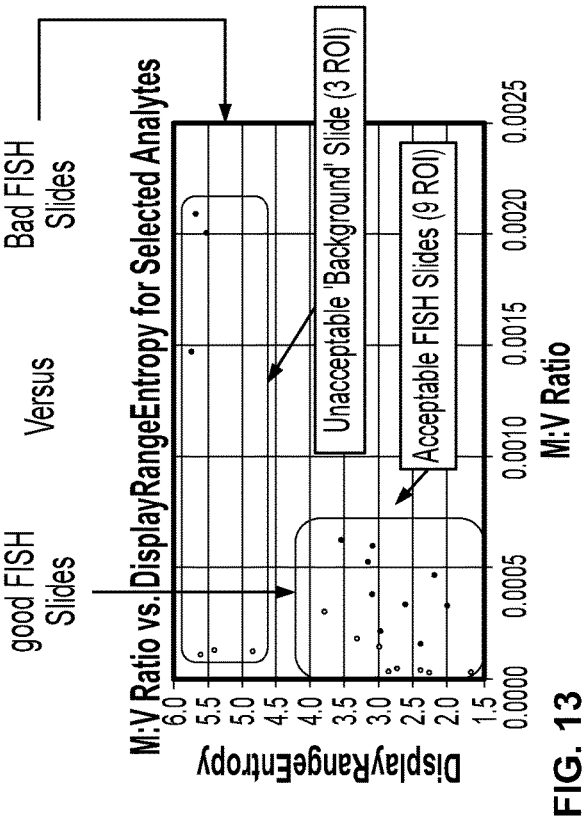
Figure 13:
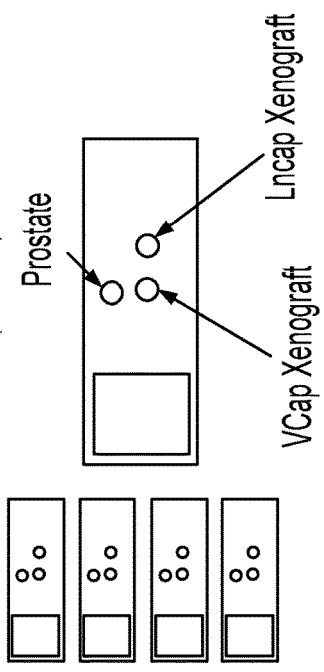
Figure 13:
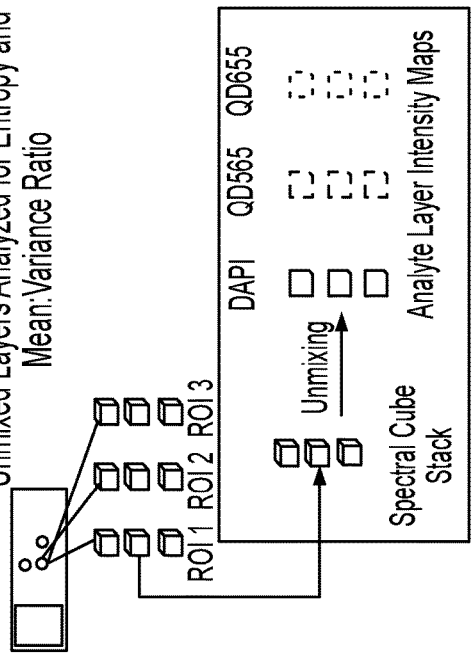

All slides were stained over a two-week period and the hapten labeled probes and quantum dot raw materials were the same for all the slides. Acquisition was standardized and automated to permit designation of multiple areas on the tissue cores and acquisition through the thickness of the section with minimal photo bleaching and standardized light (100 mw) and exposure (80 ms) and magnification (32×) used for all of the acquisitions. For each slide evaluated, three fields of view were acquired from the same VCAP xenograft tissue core. For each field of view, spectral images (96 wavelengths, 400 nm to 800 nm wavelength) were taken at 3 axial (z) positions (1.8 micron depth of field, 0.5 micron apart). The raw data was projected through the z dimension and unmixed using a linear least squares method against reference spectra to yield images representing the analytes (see FIG. 13).

Example 4—Processing of Unmixed Images

The unmixed analyte layers were subsequently analyzed for image entropy and the M/V Ratio using the computation module disclosed herein and the code from Examples 1 and 2. The metrics were collected into populations of measurements for evaluation of differences between metric values for slides determined to be "acceptable" and "unacceptable" staining. This resulted in three measurements per slide (serial sections of the same xenograft block) that were used to compare the values obtained slide to slide and determine whether the numerical descriptors reflected differences between the slides.

Example 5—Evaluation of Metrics

In order to determine how consistent the computed metrics were, multiple measurements from several slides were acquired and were plotted using box and whisker plots to depict the distributions of measurements from each slide. Using this format, the populations of computed metric measurements were compared to determine whether the difference between computed metric measurements taken from different slides were statistically significant.

Figure 10:
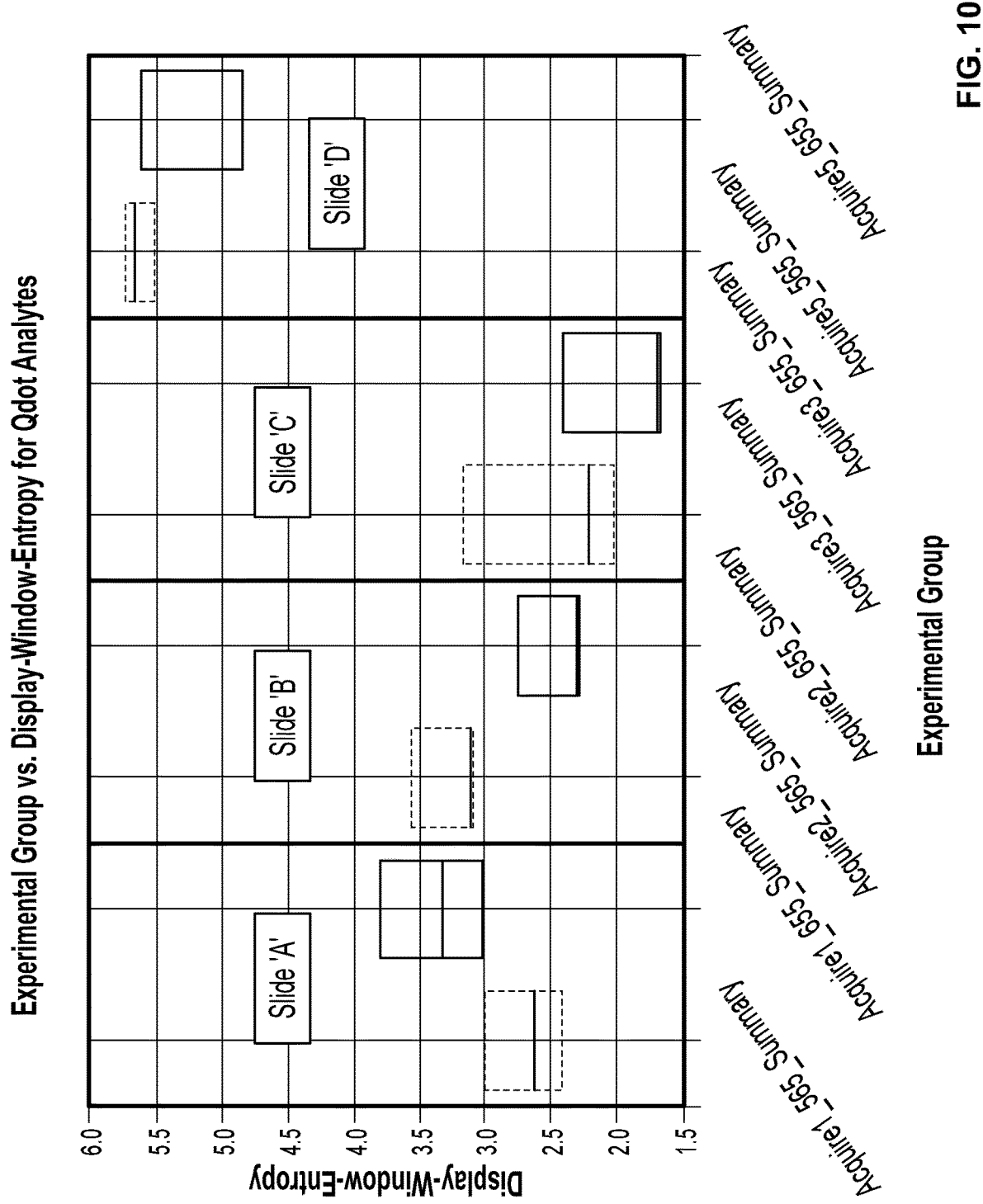
FIG. 10 demonstrates a comparison of image entropy for four slides FISH labeled for ERG 5'3'.

FIG. 10 provides a comparison of image entropy for four slides FISH labeled for ERG 5'3'. The data in 'A' represented a slide stained with QD565 (green) conjugated to the DIG hapten, and QD655 (red) conjugated to the DNP hapten. Data in 'B' and 'C' were from slides stained with QD565 conjugated to the DNP hapten, and QD655 conjugated to the DIG hapten. These slides each represented slides having "acceptable" stain quality. Each box in FIG. 10 represented the distribution of measured values for three fields of view with three z-positions acquired for each field (white line indicates mean of measurements). The relationship between entropy for quantum dot 565 and quantum dot 655 were consistent with what would have been expected by swapping the anti-hapten conjugates (if the anti-hapten conjugate influenced the likelihood of non-specific staining more than the quantum dot material). The dataset that depicted the "unacceptable" background levels was depicted in slide 'D'. Slide D was "unacceptable" because it contained a heavy non-specific deposition of quantum dot reporter, which confounded the ability to interpret the slide. As can be seen from the plots, the limits of the distribution for image entropy measured from slide 'D' did not, in this case, overlap at all with the measurements taken from acceptable FISH stained slides ('A' through 'C').

Figure 11:
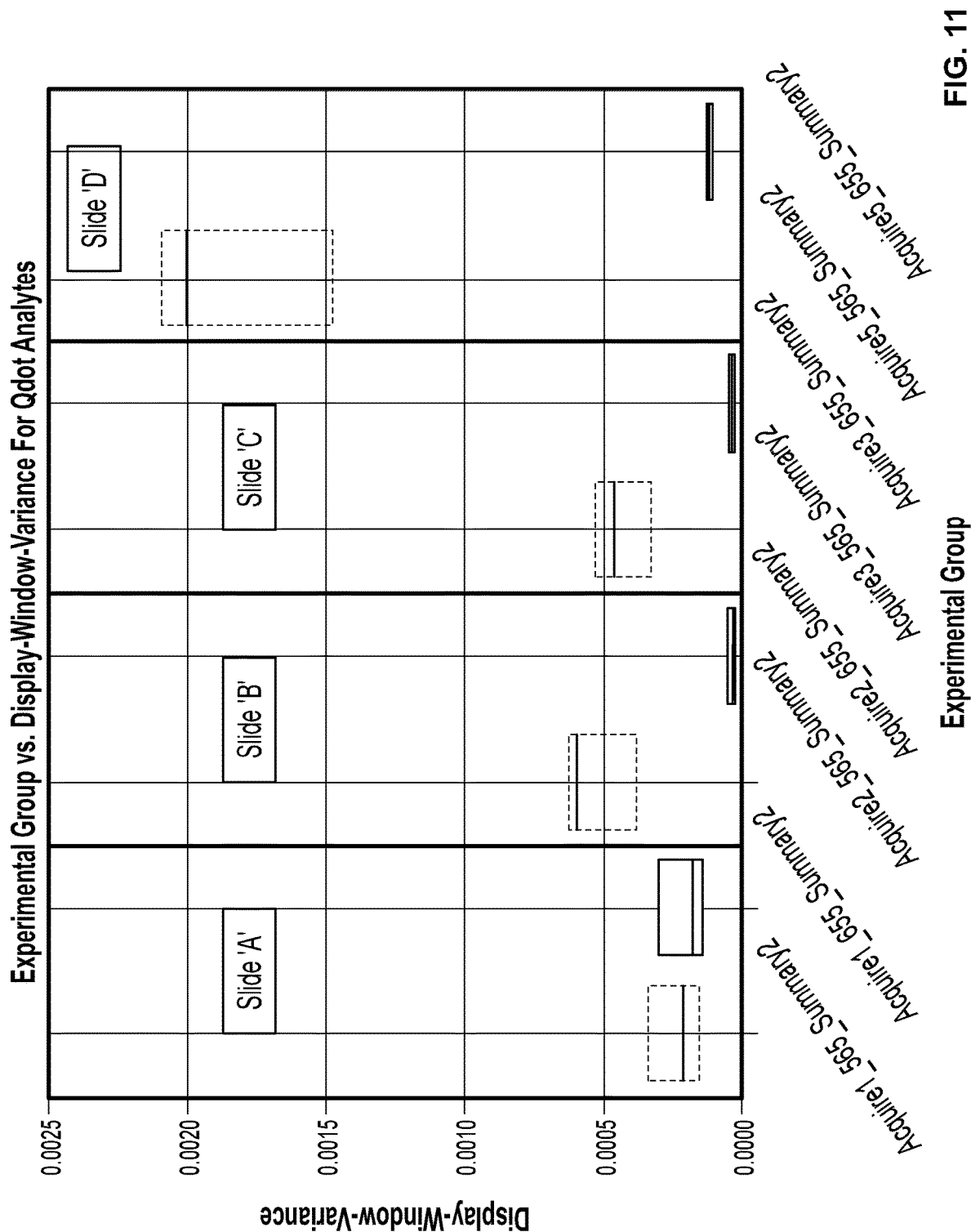
FIG. 11 demonstrates a comparison of image mean-variance ratio for four slides FISH labeled for ERG 5'3'.

FIG. 11 provides a comparison of image M/V Ratio for 4 slides FISH labeled for ERG 5'3'. The data in 'A' represented a slide stained with QD565 (green) conjugated to the DIG hapten, and QD655 (red) conjugated to the DNP hapten. Data in 'B' and 'C' were from slides stained with QD565 conjugated to the DNP hapten, and QD655 conjugated to the DIG hapten. These slides, again, had "acceptable" quality. Each box represented the distribution of measured values for three fields of view with three z-positions acquired for each field (white line indicates mean of measurements). The dataset that depicted the unacceptable background levels was depicted in 'D' (same slide as used above). As could be seen from the plots, the limits of the distribution for image M/V Ratio measured from slide 'D' did not, in this case, overlap at all with the measurements taken from acceptable FISH stained slides ('A' through 'C') in the case of the Qdot 565 stain. The M/V Ratio was comparable to the acceptable slides in the case of QD655.

Figure 12:
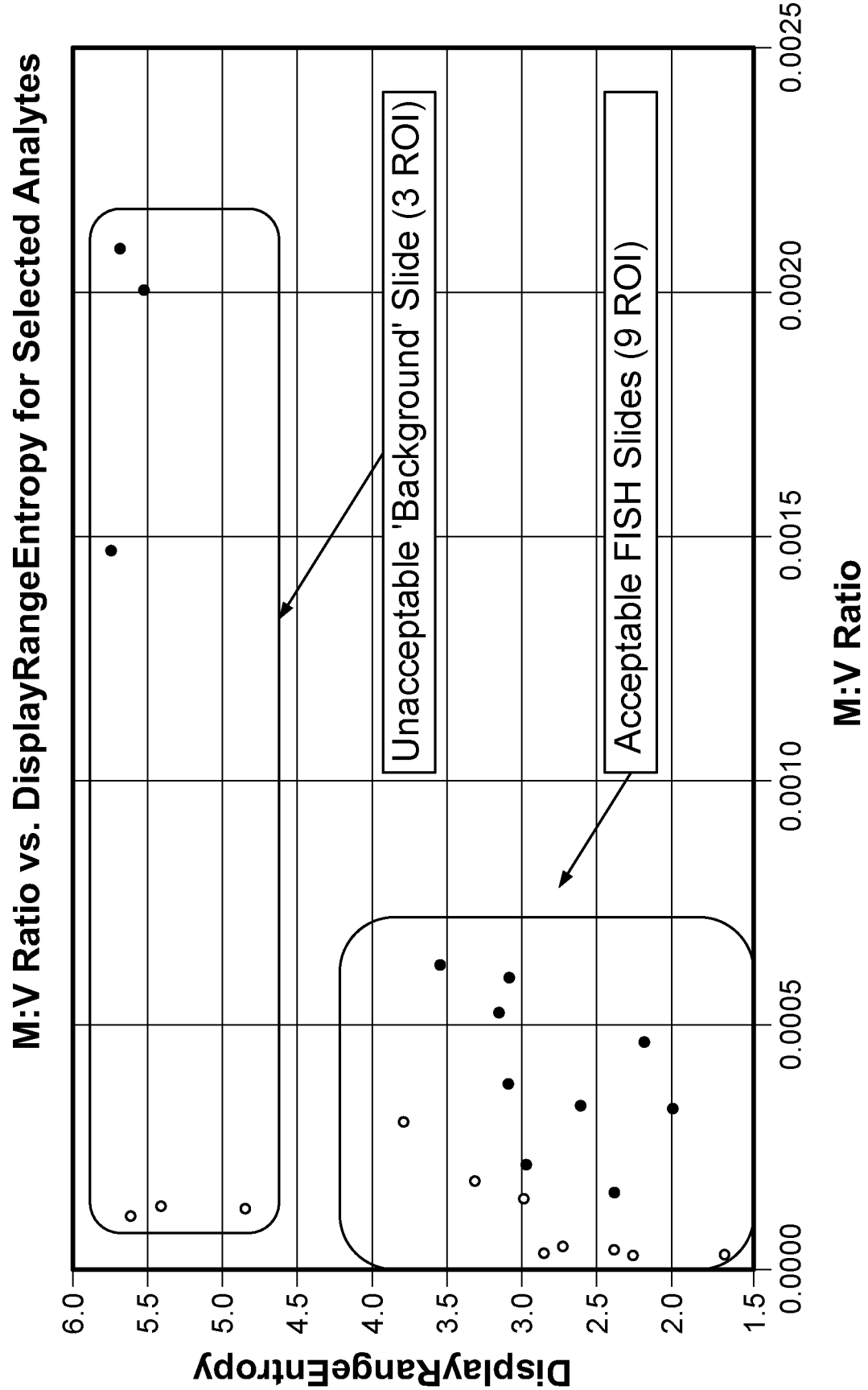
FIG. 12 provides a scatter plot of entropy vs. mean-variance ratio for slides labeled with quantum dot 655 (ERG 3') and quantum dot 565 (ERG 5')

FIG. 12 provides a scatter plot of entropy vs. M/V Ratio for acquired regions of interest. Each red dot represented the quantum dot 655 staining from a region of interest acquired and each green dot represented the quantum dot 565 staining from a region of interest acquired. As can be appreciated from this plot, the population of values for M/V Ratio taken from the slides exhibiting acceptable FISH staining were grouped into the lower left area on this plot. When both Entropy and the M/V Ratio were taken into account, the measurements taken from the high background Ratio staining were clearly separated. In the case of the quantum dot 655, entropy appeared to be the major distinction between acceptable and unacceptable stained slides. In the case of quantum dot 565, both the values for Entropy and M/V Ratio were consistently significantly different in the high-background example as compared to the regions showing acceptable staining.

It was apparent that one of the slides in this group ('D') differed from the others in level of non-specific background of the reporting quantum dots. The plots of descriptive values also conveyed this difference, though in an objective numerical form where useful specifications could be developed therefrom. This provided a novel mechanism to consistently report non-specific stain background on quantum dot labeled FISH slides. As such, these examples demonstrate that the combination of the measurement of multiple variables (entropy, mean intensity and variance) permitted the use of multiple variables to distinguish differences between slide stain distributions.

Figure 14:
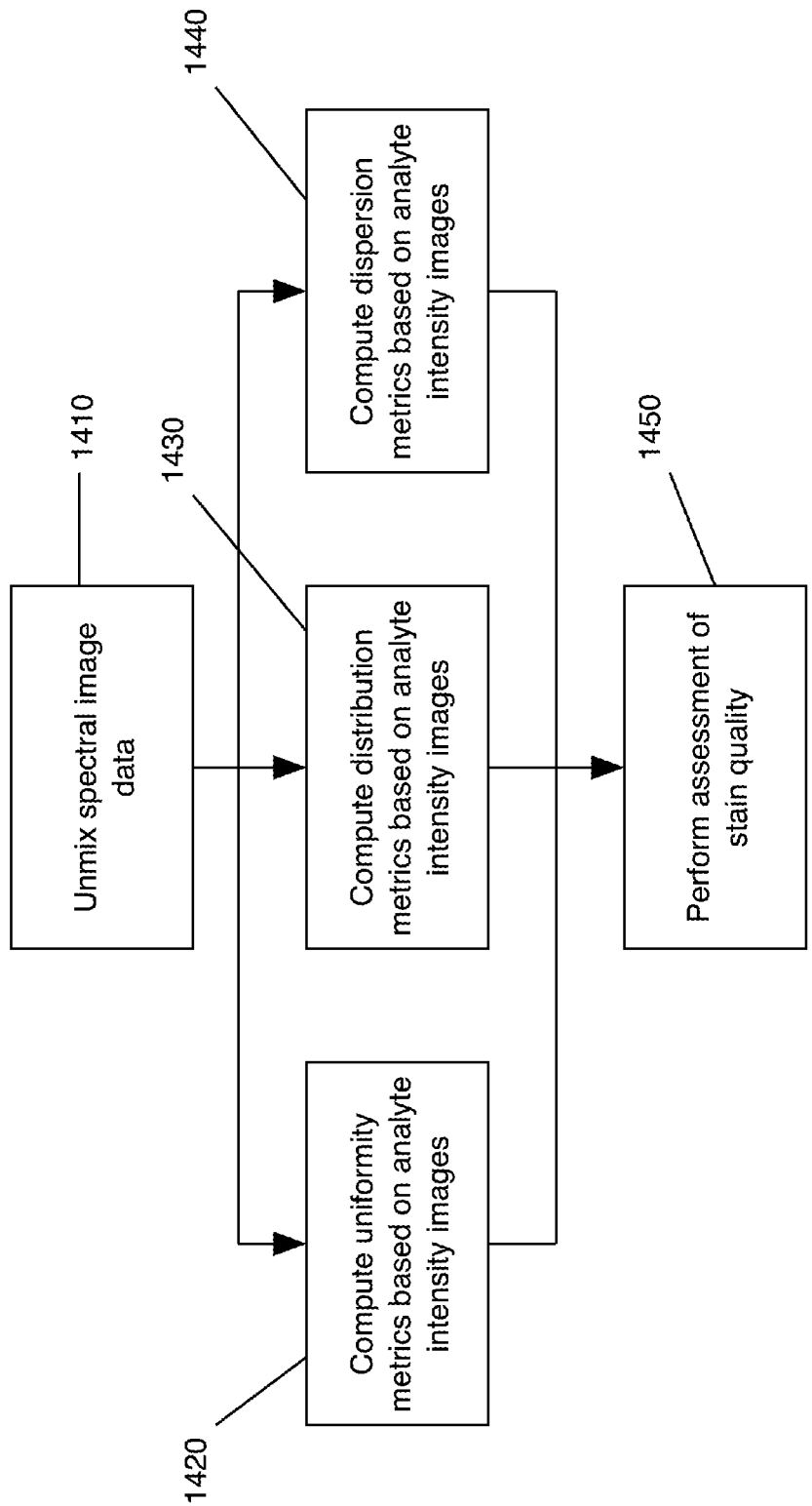
FIG. 14 provides a flowchart illustrating an embodiment of the invention wherein the metrics of uniformity, distribution and dispersion are calculated separately.

FIG. 14 illustrates one particular embodiment of the invention wherein the metrics of uniformity, distribution and dispersion are calculated separately. In a first step, multi-spectral image data of a tissue specimen are unmixed to obtain analyte intensity images (1410). Afterwards, three computations are performed. These computations are may be performed in series or in parallel, as is illustrated. A computation of uniformity metrics 1420, a computation of distribution metrics 1430 and a computation of dispersity metrics 1440 are performed. The skilled artisan is capable of selecting suitable algorithms for the computation of these metrics. In a subsequent step, the stain quality is assessed 1450 by comparing the computed metrics to pre-determined cutoff values regarding uniformity, distribution and/or dispersion of pixel intensity.

Additional Embodiments

1. A method for assessing the stain quality for application in-situ hybridization and immunohistochemistry, comprising the steps of: unmixing multi-spectral image data of a tissue specimen to obtain analyte intensity images (1410), each analyte intensity image comprising signals from a single stain; computing uniformity metrics (1420) and/or computing distribution metrics (1430) and/or computing dispersion metrics (1440) based on pixel intensity values in the analyte intensity images; and assessing a stain quality of a slide (1450) by comparing the computed metrics to pre-determined cutoff values regarding uniformity, distribution and/or dispersion of pixel intensity, wherein the stain quality of the slide is assessed as acceptable if the computed metrics meet or exceed the pre-determined cutoff values, and wherein the stain quality of the slide is assessed as unacceptable if the computed metrics do not meet the pre-determined cutoff values.

2. The method for assessing stain quality according to embodiment 1, wherein the metrics of uniformity and distribution of pixel intensity values in the analyte intensity images are derived via an entropy calculation of the analyte intensity images, and the metric of dispersion of pixel intensity values in the analyte intensity images is derived via calculation of mean-variance values.

3. The method for assessing stain quality according to embodiment 2, wherein the entropy values are computed by deriving image histograms of intensity values from each of the analyte intensity images (520), and calculating a probability that a pixel sampled from an analyte intensity image has a particular value in the respective histogram.

4. The method for assessing stain quality according to embodiment 3, wherein the image histograms of intensity values are derived by sorting pixels from each analyte intensity image into bins.

5. The method for assessing stain quality according to embodiment 4, wherein the probability that a pixel sampled from an analyte intensity image has a particular value in the respective histogram is calculated by summing a total number of pixels in all bins of the derived histogram (550) to provide a total number of pixels in that derived histogram; dividing a number of pixels in each bin of the histogram by the total number of pixels in the histogram to provide a probability of a pixel belonging within a particular bin (560); multiplying each probability of a pixel belonging within a particular bin by the logarithm to the base of 2 of the probability (570) to provide a value in bits; and summing the values in bits (580).

6. The method for assessing stain quality according to one of the embodiments 2 through 5, wherein the mean-variance ratio values are computed by deriving image histograms of intensity values from each of the analyte intensity images (520), determining a mode value and a variance value from the derived histograms (530), and calculating a ratio of a measured intensity mode value and a measured intensity variance value from the derived histograms (540).

7. The method for assessing stain quality according to one of the preceding embodiments, wherein the stains are selected from the group consisting of quantum dots, fluorophores, enzyme-deposited fluorophores and chromogens.

8. The method for assessing stain quality according to one of the preceding embodiments, wherein the multi-spectral image data is derived from a spectral cube.

9. The method for assessing stain quality according to one of the preceding embodiments, wherein the multi-spectral image data is unmixed by applying a linear least squares algorithm.

10. The method for assessing stain quality according to one of the preceding embodiments, wherein the analyte intensity images are thresholded prior to computing the entropy values and mean-variance ratio values.

11. A system for assessing the stain quality for application in-situ hybridization and immunohistochemistry, wherein the system is configured to execute a method according to any of the preceding embodiments.

12. The system for assessing the stain quality according to embodiment 11, wherein the system comprises an imaging apparatus (12).

13. A method for establishing objective criteria for assessing the stain quality for application in in-situ hybridization and immunohistochemistry, comprising the steps of:
selecting a set of reference slides and obtaining multi-spectral image data for each reference slide, wherein each reference slide is annotated with rating data quantifying the stain quality, unmixing multi-spectral image data of a tissue specimen to obtain analyte intensity images (1410), each analyte intensity image comprising signals from a single stain; computing uniformity metrics (1420) and/or computing distribution metrics (1430) and/or computing dispersion metrics (1440) based on pixel intensity values in the analyte intensity images; and deriving cutoff values for uniformity, distribution and/or dispersion of pixel intensity for assessing the stain quality by combining the computed metrics based on the analyte intensity images and the rating data quantifying the stain quality.

14. The method according to embodiment 13, wherein the cutoff values are derived by applying a support vector machine, lower discriminant analysis and/or a logistic regression.

15. A system for establishing objective criteria for assessing the stain quality for in-situ hybridization and immunohistochemistry, wherein the system is configured to execute a method according to embodiment 13 or 14.

16. A computer device (14) for objective stain assessment comprising one or more processors (120) and at least one memory (110), the at least one memory (110) storing non-transitory computer-readable instructions for execution by the one or more processors (120) to cause the one or more processors to: unmix multi-spectral image data of a tissue specimen to obtain analyte intensity images, each analyte intensity image comprising signals from a single stain; compute metrics based on the analyte intensity images, wherein the metrics are entropy values and mean-variance ratio values; and assess a stain quality of a slide by comparing the computed metrics to pre-determined cutoff values, wherein the stain quality of the slide is assessed as acceptable if the computed metrics meet or exceed the pre-determined cutoff values, and wherein the stain quality of the slide is assessed as unacceptable if the computed metrics do not meet the pre-determined cutoff values.

17. The computer device (14) according to embodiment 16, wherein the entropy values are computed by (i) deriving image histograms of intensity values from each of the analyte intensity images (520), and (ii) calculating a probability that a pixel sampled from an analyte intensity image has a particular value in the respective histogram.

18. The computer device (14) according to embodiment 17, wherein the image histograms of intensity values are derived by sorting pixels from each analyte intensity images into bins.

19. The computer device (14) according to embodiment 18, wherein the probability that a pixel sampled from an analyte intensity image has a particular value in the respective histogram is calculated by (i) summing a total number of pixels in all bins of the derived histogram to provide a total number of pixels in that derived histogram (550); (ii) dividing a number of pixels in each bin of the histogram by the total number of pixels in the histogram to provide a probability of a pixel belonging within a particular bin (560); (iii) multiplying each probability of a pixel belonging within a particular bin by the logarithm to the base of 2 of the probability to provide a value in bits (570); and (iv) summing the values in bits (580).

20. The computer device (14) according to any of embodiments 16 through 19, wherein the mean-variance ratio values are computed by (i) deriving image histograms of intensity values from each of the analyte intensity images (520), and (ii) calculating a ratio of a measured intensity mode value and a measured intensity variance value from the derived histograms (530, 540).

21. The computer device (14) according to any of embodiments 16 through 20, wherein the stains are selected from the group consisting of quantum dots, fluorophores, enzyme-deposited fluorophores and chromogens.

22. The computer device (14) according to any of embodiments 16 through 21, wherein the multi-spectral image data is unmixed by applying a linear least squares algorithm.

23. The computer device (14) according to any of embodiments 16 through 22, wherein the analyte intensity images are thresholded prior to computing the entropy values and mean-variance ration values.

24. A computer device (14) for objective stain assessment comprising one or more processors (120) and at least one memory (110), the at least one memory storing non-transitory computer-readable instructions for execution by the one or more processors (120) to cause the one or more processors to: unmix a multi-spectral image of a tissue specimen to obtain analyte intensity images; compute metrics based on the analyte intensity images, wherein a first metric is a numerical descriptor of the uniformity and distribution of pixel intensity values in the analyte intensity images, and wherein a second metric is a numerical descriptor of the dispersion of pixel intensity values in the analyte intensity images, the pixel intensity values corresponding to signals from a detectable stain in each analyte intensity image; assess a stain quality of a slide by comparing the computed metrics to pre-determined cutoff values, wherein the stain quality of the slide is assessed as acceptable if the computed metrics meet or exceed the pre-determined cutoff values, and wherein the stain quality of the slide is assessed as unacceptable if the computed metrics do not meet the pre-determined cutoff values.

25. The computer device (14) according to embodiment 24, wherein the first metric comprises entropy values.

26. The computer device (14) according to embodiment 25, wherein the entropy values are computed by (i) deriving image histograms of intensity values from each of the analyte intensity images (520), and (ii) calculating a probability that a pixel sampled from an analyte intensity image has a particular value in the respective histogram 27. The computer device (14) according to embodiment 26, wherein the image histograms of intensity values are derived by sorting pixels from each analyte intensity images into bins.

28. The computer device (14) according to embodiment 27, wherein the probability that a pixel sampled from an analyte intensity image has a particular value in the respective histogram is calculated by (i) summing a total number of pixels in all bins of the derived histogram to provide a total number of pixels in that derived histogram (550); (ii) dividing a number of pixels in each bin of the histogram by the total number of pixels in the histogram to provide a probability of a pixel belonging within a particular bin (560); (iii) multiplying each probability of a pixel belonging within a particular bin by the logarithm to the base of 2 of the probability to provide a value in bits (570); and (iv) summing the values in bits (580).

29. The computer device (14) according to one of the embodiments 24 through 28, wherein the second metrics comprises mean-variance ratio values.

30. The computer device (14) according to embodiment 29, wherein the mean-variance ratio values are derived by (i) deriving image histograms of intensity values from each of the analyte intensity images (520), and (ii) calculating a ratio of a measured intensity mode value and a measured intensity variance value from the intensity histograms (530, 540).

31. The computer device (14) according to one of the embodiments 24 through 30, wherein the multi-spectral image is of a tissue specimen that was stained in an assay, and where the tissue specimen comprises at least two detectable analytes, wherein the at least two detectable analytes are independently selected from the group consisting of quantum dots, fluorophores, enzyme-deposited fluorophores and chromogens.

32. The computer device (14) according to one of the embodiments 24 through 31, wherein the pre-determined cutoff values are entropy cutoff values and mean-variance ratio cutoff values.

33. The computer device (14) according to one of the embodiments 24 through 32, wherein the multispectral image data is derived from a spectral cube.

34. A computer device (14) for objective stain assessment comprising one or more processors (120) and at least one memory (110), the at least one memory (110) storing non-transitory computer-readable instructions for execution by the one or more processors to cause the one or more processors (110) to: unmix multi-spectral image data of a tissue specimen stained in an immunohistochemical assay or an in situ hybridization assay for the presence of a particular biomarker to obtain analyte intensity images, each analyte intensity image comprising signals from a single stain; compute entropy values for each of the analyte intensity images by (i) deriving image histograms of intensity values from each of the analyte intensity images, and (ii) calculating a probability that a pixel sampled from an analyte intensity image has a particular value in the respective histogram; compute mean-variance ratios for each of the analyte intensity images by (i) deriving image histograms of intensity values from each of the analyte intensity images, and (ii) calculating a ratio of a measured intensity mode value and a measured intensity variance value from the intensity histograms, and assess a uniformity of a stain and/or the presence of anomalous backgrounds staining by comparing the computed entropy and mean-variance ratio values to pre-determined entropy cutoff values and mean-variance ratio cutoff values, wherein the uniformity of the stain and/or the presence of anomalous backgrounds staining is assessed as acceptable if the computed entropy and mean-variance ratio values meet or exceed the pre-determined cutoff values, and wherein the uniformity of the stain and/or the presence of anomalous backgrounds staining is assessed as unacceptable if the computed entropy and mean-variance ratio values do not meet the pre-determined cutoff values.

35. A system (10) comprising the computer device (14) according to any of embodiments 16 to 34, and a multispectral imaging system (12).

36. A computer-implemented method of stain assessment comprising:
unmixing multi-spectral image data to obtain analyte intensity images, the analyte intensity images each comprising a single image channel corresponding to signals from a particular stain; computing entropy values for each of the analyte intensity images; computing mean-variance ratios for each of the analyte intensity images; and assessing a stain quality of a slide by comparing the computed entropy and mean-variance ratio values to pre-determined entropy cutoff values and mean-variance ratio cutoff values, wherein a stain quality is assessed as acceptable if the computed entropy and mean-variance ratio values meet or exceed the pre-determined cutoff values, and wherein the stain quality is assessed as unacceptable if the computed entropy and mean-variance ratio values do not meet the pre-determined cutoff values.

37. The computer-implemented method according to embodiment 36, wherein the entropy values are computed by (i) deriving image histograms of intensity values from each of the analyte intensity images (520), and (ii) calculating a probability that a pixel sampled from an analyte intensity image has a particular value in the respective histogram.

38. The computer-implemented method according to embodiment 37, wherein the image histograms of intensity values are derived by sorting pixels from each analyte intensity images into bins.

39. The computer-implemented method according to embodiment 38, wherein the probability that a pixel sampled from an analyte intensity image has a particular value in the respective histogram is calculated by (i) summing a total number of pixels in all bins of the derived histogram to provide a total number of pixels in that derived histogram (550); (ii) dividing a number of pixels in each bin of the histogram by the total number of pixels in the histogram to provide a probability of a pixel belonging within a particular bin (560); (iii) multiplying each probability of a pixel belonging within a particular bin by the logarithm to the base of 2 of the probability to provide a value in bits (570); and (iv) summing the values in bits (580).

40. The computer-implemented method according to any of embodiments 36 to 39, wherein the mean-variance ratio values are computed by (i) deriving image histograms of intensity values from each of the analyte intensity images (520), and (ii) calculating a ratio of a measured intensity mode value and a measured intensity variance value from the intensity histograms (530, 540).

41 The computer-implemented method according to any of embodiments 36 to 40, wherein the detectable analytes are selected from the group consisting of quantum dots, fluorophores, enzyme-deposited fluorophores and chromogens.

42. A computer device (14) for stain assessment comprising one or more processors (120) and at least one memory (110), the at least one memory (110) storing non-transitory computer-readable instructions for execution by the one or more processors to cause the one or more processors to (i) run an image processing module (210) to receive multi-spectral images of a tissue specimen comprising detectable analytes; (ii) run an unmixing module (240) to unmix the multi-spectral images into analyte intensity images, each analyte intensity image comprising signals from one of the detectable analytes; (ii) run a metric computation module (220) to derive metrics based on the analyte intensity images, the metrics corresponding to objective criteria for stain assessment; and (iii) run an evaluation module (230) to assess a stain quality by comparing the computed metrics to pre-determined cutoff values, wherein the stain quality is assessed as acceptable if the computed metrics meet or exceed the pre-determined cutoff values, and wherein the stain quality is assessed as unacceptable if the computed metrics do not meet the pre-determined cutoff values.

43. The computer device (14) according to embodiment 42, wherein the metrics are entropy values and mean-variance ratio values, and wherein the entropy values are calculated by (a) sorting the analyte intensity image pixels to provide corresponding intensity histograms (520); and (b) calculating the probability of a sampled pixel having a value in a particular histogram bin derived from the intensity histograms; and wherein the mean-variance ratios are derived by (a) sorting the analyte intensity image pixels to provide corresponding intensity histograms (520); and (b) calculating a ratio of a measured intensity mode value and a measured intensity variance value from the intensity histograms (530, 540).

44. A computer device (14) for establishing objective criteria for stain assessment comprising one or more processors (14) and at least one memory (110), the at least one memory (110) storing non-transitory computer-readable instructions for execution by the one or more processors to cause the one or more processors to: unmix multi-spectral image data of a tissue specimen stained in an immunohistochemical assay or an in situ hybridization assay for the presence of a particular biomarker to obtain analyte intensity images, each analyte intensity image comprising signals from a single stain, and wherein the multi-spectral image data is from a plurality of reference slides that have been identified as acceptable or unacceptable; compute entropy values and mean-variance ratio values based on each of the obtained analyte intensity images; and derive cutoff values for staining quality assessment based on the computed entropy and mean-variance ratio values, wherein the cutoff values for staining quality assessment correspond to the stains used in the immunohistochemical assay or the in situ hybridization assay.

45. The computer device (14) according to embodiment 44, wherein the entropy values are computed by (i) deriving image histograms of intensity values from each of the analyte intensity images (520), and (ii) calculating a probability that a pixel sampled from an analyte intensity image has a particular value in the respective histogram.

46. The computer device (14) according to embodiment 45, wherein the image histograms of intensity values are derived by sorting pixels from each analyte intensity images into bins.

47. The computer device (14) according to embodiment 46, wherein the probability that a pixel sampled from an analyte intensity image has a particular value in the respective histogram is calculated by (i) summing a total number of pixels in all bins of the derived histogram to provide a total number of pixels in that derived histogram (550); (ii) dividing a number of pixels in each bin of the histogram by the total number of pixels in the histogram to provide a probability of a pixel belonging within a particular bin (560); (iii) multiplying each probability of a pixel belonging within a particular bin by the logarithm to the base of 2 of the probability to provide a value in bits (570); and (iv) summing the values in bits (580).

48. The computer device (14) according to any of embodiments 44 through 47, wherein the mean-variance ratio values are computed by (i) deriving image histograms of intensity values from each of the analyte intensity images (520), and (ii) calculating a ratio of a measured intensity mode value and a measured intensity variance value from the intensity histograms (530, 540).

49. The computer device (14) according to any of embodiments 44 through 48, wherein stains are selected from the group consisting of quantum dots, fluorophores, enzyme-deposited fluorophores and chromogens.

50. The computer device (14) according to any of embodiments 44 through 49, wherein the cutoff values are derived by training a support vector machine with a vector of computed entropy values and a vector of computed mean-variance ratio values.

51. A computer-implemented method for establishing objective criteria for stain assessment comprising: unmixing multi-spectral image data of a tissue specimen from a plurality of reference slides to obtain a series of analyte intensity images, wherein each analyte intensity image comprises signals from a single stain, and wherein the reference slides have each been identified as acceptable or unacceptable; computing entropy values and mean-variance ratio values based on each of the obtained analyte intensity images; and deriving cutoff values for staining quality assessment based on the computed entropy and mean-variance ratio values, wherein the cutoff values for staining quality assessment correspond to the stains used in the immunohistochemical assay or the in situ hybridization assay.

52. The computer-implemented method according to embodiment 51, wherein the cutoff values are derived by applying one of a support vector machine, lower discriminant analysis or a logistic regression.

53. The computer-implemented method according to embodiment 52, wherein the cutoff values are supplied to the support vector machine which is trained to separate metrics corresponding to acceptable references slides from metrics corresponding to unacceptable reference slides.

54. The computer-implemented method according to any of embodiments 51 through 53, wherein the entropy values are computed by (i) deriving image histograms of intensity values from each of the analyte intensity images (520), and (ii) calculating a probability that a pixel sampled from an analyte intensity image has a particular value in the respective histogram 55. The computer-implemented method according to embodiment 54, wherein the image histograms of intensity values are derived by sorting pixels from each analyte intensity images into bins.

56. The computer-implemented method according to embodiment 55, wherein the probability that a pixel sampled from an analyte intensity image has a particular value in the respective histogram is calculated by (i) summing a total number of pixels in all bins of the derived histogram to provide a total number of pixels in that derived histogram (550); (ii) dividing a number of pixels in each bin of the histogram by the total number of pixels in the histogram to provide a probability of a pixel belonging within a particular bin (560); (iii) multiplying each probability of a pixel belonging within a particular bin by the logarithm to the base of 2 of the probability to provide a value in bits (570); and (iv) summing the values in bits (580).

57. The computer-implemented method according to any of the embodiments 51 through 56, wherein the mean-variance ratio values are computed by (i) deriving image histograms of intensity values from each of the analyte intensity images (520), and (ii) calculating a ratio of a measured intensity mode value and a measured intensity variance value from the intensity histograms (530, 540).

58. A computer device (14) for objective stain assessment comprising one or more processors (120) and at least one memory (110), the at least one memory (110) storing non-transitory computer-readable instructions for execution by the one or more processors (120) to cause the one or more processors to: unmix multi-spectral image data of a tissue specimen to obtain analyte intensity images, each analyte intensity image comprising signals from a single stain; compute entropy values for each of the analyte intensity images by (i) deriving image histograms of intensity values from each of the analyte intensity images, and (ii) calculating a probability that a pixel sampled from an analyte intensity image has a particular value in the respective histogram; compute mean-variance ratios for each of the analyte intensity images by (i) deriving image histograms of intensity values from each of the analyte intensity images, and (ii) calculating a ratio of a measured intensity mode value and a measured intensity variance value from the intensity histograms, assess a stain quality of a slide by comparing the computed entropy and mean-variance ratio values to pre-determined entropy cutoff values and mean-variance ratio cutoff values, wherein a stain quality is assessed as acceptable if the computed entropy and mean-variance ratio values meet or exceed the pre-determined cutoff values, and wherein the stain quality is assessed as unacceptable if the computed entropy and mean-variance ratio values do not meet the pre-determined cutoff values; and if stain quality is determined to be unacceptable, determine whether a scanning instrument or a staining instrument is a root cause.

59. The computer device (14) according to embodiment 58, wherein the unacceptable stain quality of a slide comprises at least one of an inconsistency in stain size, stain contrast, or stain coverage.

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit and scope of the present disclosure as defined by the appended claims.

The invention claimed is:

1. A computer device for objective stain assessment comprising one or more processors and at least one memory, the at least one memory storing non-transitory computer-readable instructions for execution by the one or more processors to cause the one or more processors to:
   unmix multi-spectral image data of a tissue specimen stained in an immunohistochemical assay or an in situ hybridization assay for the presence of a particular biomarker to obtain analyte intensity images, each analyte intensity image comprising signals from a single stain;
   compute metrics based on the analyte intensity images, wherein the metrics are entropy values and mean-variance ratio values; and
   assess a stain quality of a slide by comparing the computed metrics to pre-determined cutoff values, wherein the stain quality of the slide is assessed as acceptable if the computed metrics meet or exceed the pre-determined cutoff values, and wherein the stain quality of the slide is assessed as unacceptable if the computed metrics do not meet the pre-determined cutoff values, wherein the mean-variance ratio values are computed by (i) deriving image histograms of intensity values from each of the analyte intensity images, and (ii) calculating a ratio of a measured intensity mode value and a measured intensity variance value from the derived histograms.

2. The computer device of claim 1, wherein the entropy values are computed by (i) deriving image histograms of intensity values from each of the analyte intensity images, and (ii) calculating a probability that a pixel sampled from an analyte intensity image has a particular value in the respective histogram.

3. The computer device of claim 2, wherein the image histograms of intensity values are derived by sorting pixels from each analyte intensity images into bins.

4. The computer device of claim 2, wherein the probability that a pixel sampled from an analyte intensity image has a particular value in the respective histogram is calculated by (i) summing a total number of pixels in all bins of the derived histogram to provide a total number of pixels in that derived histogram; (ii) dividing a number of pixels in each bin of the histogram by the total number of pixels in the histogram to provide a probability of a pixel belonging within a particular bin; (iii) multiplying each probability of a pixel belonging within a particular bin by the logarithm to the base of 2 of the probability to provide a value in bits; and (iv) summing the values in bits.

5. The computer device of claim 1, wherein the stains are selected from the group consisting of quantum dots, fluorophores, enzyme-deposited fluorophores and chromogens.

6. The computer device of claim 1, wherein the analyte intensity images are thresholded prior to computing the entropy values and mean-variance ration values.

7. The computer device of claim 1, further comprising the step of determining whether a scanning instrument or a staining instrument is a root cause of the unacceptable stain quality, wherein the unacceptable stain quality of a slide comprises at least one of an inconsistency in stain size, stain contrast, or stain coverage.

8. A system comprising the computer device of claim 1, and a multispectral imaging system.

9. A computer device for objective stain assessment comprising one or more processors and at least one memory, the at least one memory storing non-transitory computer-readable instructions for execution by the one or more processors to cause the one or more processors to:
   unmix multi-spectral image data of a tissue specimen stained in an immunohistochemical assay or an in situ hybridization assay for the presence of a particular biomarker to obtain analyte intensity images, each analyte intensity image comprising signals from a single stain;
   compute metrics based on the analyte intensity images, wherein the metrics are a measurement of a variance of pixel values in image histograms derived from the analyte intensity images and mean-variance ratio values; and
   assess a stain quality of a slide by comparing the computed metrics to pre-determined cutoff values, wherein the stain quality of the slide is assessed as acceptable if the computed metrics meet or exceed the pre-determined cutoff values, and wherein the stain quality of the slide is assessed as unacceptable if the computed metrics do not meet the pre-determined cutoff values, wherein the mean-variance ratio values are computed by (i) deriving image histograms of intensity values from each of the analyte intensity images, and (ii) calculating a ratio of a measured intensity mode value and a measured intensity variance value from the derived histograms.

10. The computer device of claim 9, wherein the stains are selected from the group consisting of quantum dots, fluorophores, enzyme-deposited fluorophores and chromogens.

11. The computer device of claim 9, wherein the analyte intensity images are thresholded prior to computing the measurements of the variance of the pixel values and mean-variance ratio values.

12. The computer device of claim 9, further comprising the step of determining whether a scanning instrument or a staining instrument is a root cause of the unacceptable stain quality, wherein the unacceptable stain quality of a slide comprises at least one of an inconsistency in stain size, stain contrast, or stain coverage.

13. A computer device for objective stain assessment comprising one or more processors and at least one memory, the at least one memory storing non-transitory computer-readable instructions for execution by the one or more processors to cause the one or more processors to:
   unmix multi-spectral image data of a tissue specimen stained in an immunohistochemical assay or an in situ hybridization assay for the presence of a particular biomarker to obtain analyte intensity images, each analyte intensity image comprising signals from a single stain;
   compute metrics based on the analyte intensity images, wherein the metrics are a measurement of a standard deviation of pixel values in image histograms derived from the analyte intensity images and mean-variance ratio values; and
   assess a stain quality of a slide by comparing the computed metrics to pre-determined cutoff values, wherein the stain quality of the slide is assessed as acceptable if the computed metrics meet or exceed the pre-determined cutoff values, and wherein the stain quality of the slide is assessed as unacceptable if the computed metrics do not meet the pre-determined cutoff values,
   wherein the mean-variance ratio values are computed by (i) deriving image histograms of intensity values from each of the analyte intensity images, and (ii) calculating a ratio of a measured intensity mode value and a measured intensity variance value from the derived histograms.

14. The computer device of claim 13, wherein the stains are selected from the group consisting of quantum dots, fluorophores, enzyme-deposited fluorophores and chromogens.

15. The computer device of claim 13, wherein the analyte intensity images are thresholded prior to computing the measurements of the standard deviation of the pixel values and mean-variance ratio values.

16. The computer device of claim 13, further comprising the step of determining whether a scanning instrument or a staining instrument is a root cause of the unacceptable stain quality, wherein the unacceptable stain quality of a slide comprises at least one of an inconsistency in stain size, stain contrast, or stain coverage.

* * * * *